United States Patent
Lu et al.

(10) Patent No.: US 11,053,790 B2
(45) Date of Patent: Jul. 6, 2021

(54) ACOUSTIC DOWNHOLE LEAK CLASSIFICATION AND QUANTIFICATION

(71) Applicant: Halliburton Energy Services, Inc., Houston, TX (US)

(72) Inventors: Yinghui Lu, The Woodlands, TX (US); Paris Smaragdis, Urbana, IL (US); Avinash Vinayak Taware, The Woodlands, TX (US); Daniel Viassolo, Katy, TX (US); Clifford Lloyd Macklin, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 513 days.

(21) Appl. No.: 15/539,486

(22) PCT Filed: Jan. 11, 2016

(86) PCT No.: PCT/US2016/012831
§ 371 (c)(1),
(2) Date: Jun. 23, 2017

(87) PCT Pub. No.: WO2016/115030
PCT Pub. Date: Jul. 21, 2016

(65) Prior Publication Data
US 2018/0010443 A1  Jan. 11, 2018

Related U.S. Application Data

(60) Provisional application No. 62/103,012, filed on Jan. 13, 2015.

(51) Int. Cl.
*E21B 47/107* (2012.01)
*G01V 1/50* (2006.01)
(Continued)

(52) U.S. Cl.
CPC .......... *E21B 47/107* (2020.05); *E21B 47/113* (2020.05); *E21B 49/08* (2013.01); *G01V 1/50* (2013.01); *G01V 1/52* (2013.01)

(58) Field of Classification Search
CPC ........................... E21B 47/101; E21B 47/107
See application file for complete search history.

(56) References Cited

U.S. PATENT DOCUMENTS

| 4,646,273 A | 2/1987 | Carlson et al. |
| 7,219,762 B2 | 5/2007 | James et al. |

(Continued)

FOREIGN PATENT DOCUMENTS

| EP | 2208039 A2 | 7/2010 |
| EP | 2418466 A2 | 2/2012 |

(Continued)

OTHER PUBLICATIONS

Extended Search Report issued for EP Patent Application No. 16737669.8, dated May 15, 2018, 8 pages.

(Continued)

*Primary Examiner* — John E Breene
*Assistant Examiner* — Jeffrey C Morgan
(74) *Attorney, Agent, or Firm* — Haynes and Boone, LLP

(57) ABSTRACT

Described herein are tools, systems, and methods for detecting, classifying, and/or quantifying underground fluid flows based on acoustic signals emanating therefrom, using a plurality of acoustic sensors disposed in the wellbore in conjunction with array signal processing and systematic feature-based classification and estimation methods.

18 Claims, 17 Drawing Sheets

(51) Int. Cl.
    *G01V 1/52*     (2006.01)
    *E21B 47/113*   (2012.01)
    *E21B 49/08*    (2006.01)

(56)        References Cited

U.S. PATENT DOCUMENTS

| | | |
|---|---|---|
| 7,464,588 B2 | 12/2008 | Steinsiek |
| 2010/0219334 A1 | 9/2010 | Legrand et al. |
| 2010/0268489 A1 | 10/2010 | Lie et al. |
| 2011/0188346 A1 | 8/2011 | Hull |
| 2011/0199607 A1 | 8/2011 | Kanellopoulos et al. |
| 2011/0255077 A1 | 10/2011 | Rogers |
| 2012/0092960 A1 | 4/2012 | Gaston et al. |
| 2012/0143515 A1 | 6/2012 | Norman et al. |
| 2013/0167628 A1 | 7/2013 | Hull et al. |
| 2014/0110124 A1 | 4/2014 | Goldner et al. |

FOREIGN PATENT DOCUMENTS

| | | | |
|---|---|---|---|
| GB | 2367 362 A | | 4/2002 |
| WO | WO 2009/048340 A2 | | 4/2009 |
| WO | WO2009048340 | * | 4/2009 |
| WO | WO 2014/004327 A1 | | 1/2014 |

OTHER PUBLICATIONS

International Search Report and The Written Opinion of the International Search Authority, or the Declaration, dated Mar. 29, 2016, PCT/US2016/012831, 15 pages, ISA/KR.

* cited by examiner

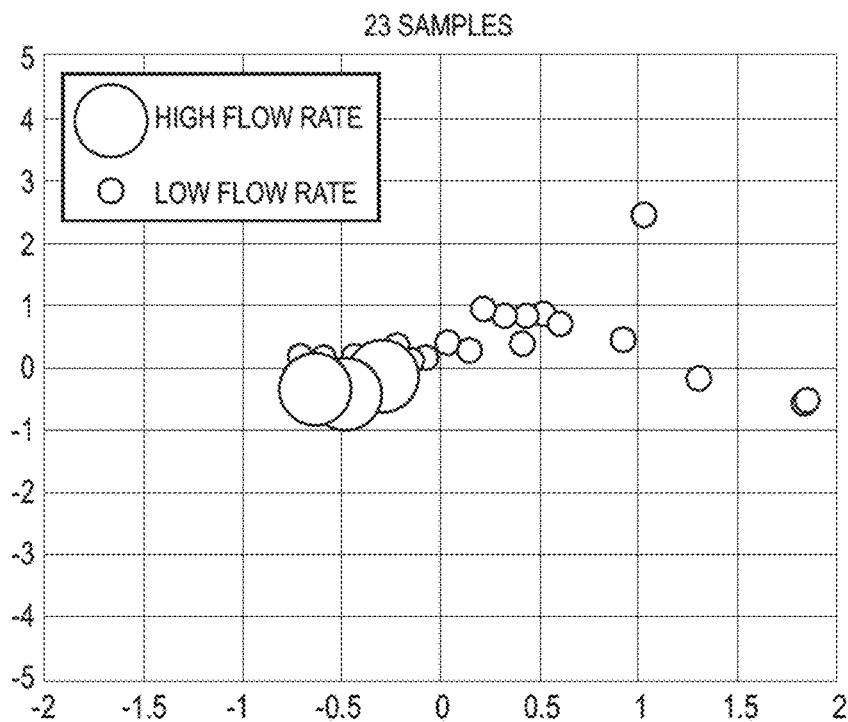
FIG. 7C
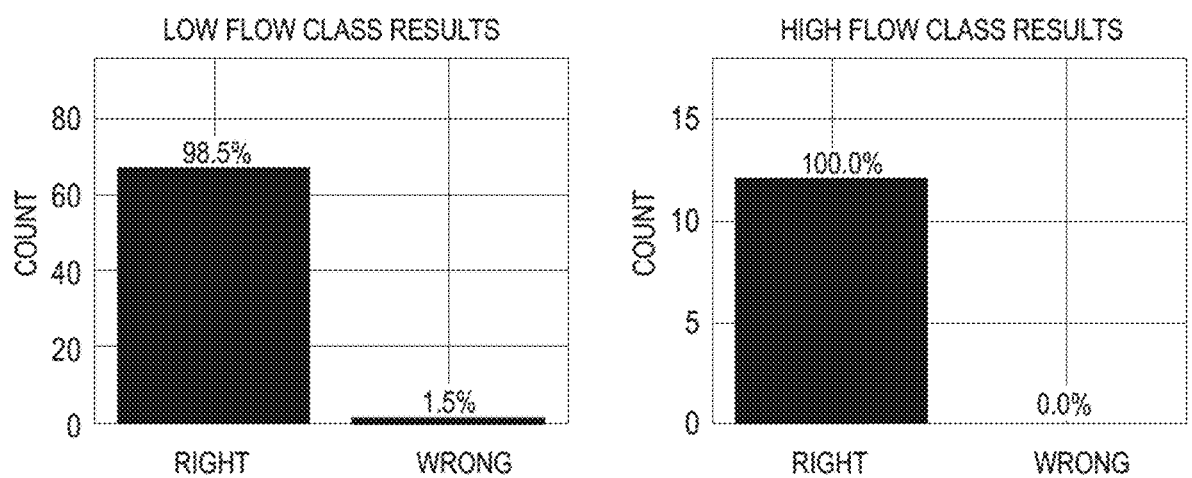
FIG. 7D
FIG. 7E

ACOUSTIC DOWNHOLE LEAK CLASSIFICATION AND QUANTIFICATION

CROSS-REFERENCE TO RELATED APPLICATIONS

The present application is a U.S. National Stage patent application of International Application No. PCT/US2016/012831, filed on Jan. 11, 2016, which claims priority to U.S. Provisional Patent Application Ser. No. 62/103,012, filed on Jan. 13, 2015, the disclosures of which are hereby incorporated by reference in their entirety.

BACKGROUND

During the life cycle of an oil or gas well, it is desirable to monitor and maintain well integrity. In particular, the integrity of the well barriers (such as the production tubing, the well casing, and the surrounding cement sheath) is important to ensure safe operation of the well and avoid blow-out incidents or leakage of hydrocarbons to the environment. To obtain a better understanding of the state of a well and make appropriate decisions on repairing or controlling a damaged well, it is desirable to not only detect undesired flows due to leaks, but also to discriminate between different types of leaks (e.g., oil, gas, water, or particle leaks, or multi-phase leaks that include more than one of the listed leaking substances), and, for a given type of leak, to quantify the leak (e.g., by estimating its flow rate).

Leaks in the well barriers can be detected based on the acoustic signals emitted by underground fluid flows (e.g., of oil or gas) in and around a wellbore, which, in turn, can be measured, e.g., with fiber cables disposed along the wellbore or with acoustic point sensors such as Fiber Bragg Grating (FBG) sensors or hydrophones. However, existing methods fail to provide sufficient characterization of any detected flows.

BRIEF DESCRIPTION OF THE DRAWINGS

FIG. 7C is a graph of a two-dimensional feature space derived from the signals shown in FIG. 7B, in accordance with various embodiments.

FIGS. 7D and 7E are bar diagrams illustrating the specificity and sensitivity, respectively, achieved for the data of FIGS. 7B and 7C, in accordance with various embodiments.

DETAILED DESCRIPTION

Described herein are tools, systems, and methods for detecting, classifying, and/or quantifying underground fluid flows based on acoustic signals emanating therefrom, using a plurality of acoustic sensors disposed in the wellbore in conjunction with array signal processing and systematic feature-based classification and estimation methods. Classifying the leak may involve, e.g., determining the type of substance that leaks, which may be oil, gas, water, particles, or a combination thereof. Quantifying the flow may involve determining a flow rate or other quantitative flow parameter. In various embodiments, array signal processing is employed to combine the acoustic signals measured by the individual sensors into a fused signal that generally approximates the true acoustic source signal more closely than any one of the individual sensor signals, thereby providing a better starting point for the subsequent feature extraction and evaluation. A "feature," as used herein consistently with the general understanding of the term by those of ordinary skill in the art, is a parameter derived from the signal, such as, without limitation, a signal amplitude or energy in the time domain, a power spectral density in the frequency domain, or the coefficients of the wavelet transform of the signal in the time-frequency domain. Classification and estimation tasks may be carried out based on one or more (e.g., a few) representative features that have been selected from a much larger initial feature space based on their ability to discriminate between different types of leaks (such as oil, gas, water, particle, or multi-phase leaks) and/or based on a high correlation of their feature values with the flow rate or another quantitative flow parameter of interest.

Figure 1:
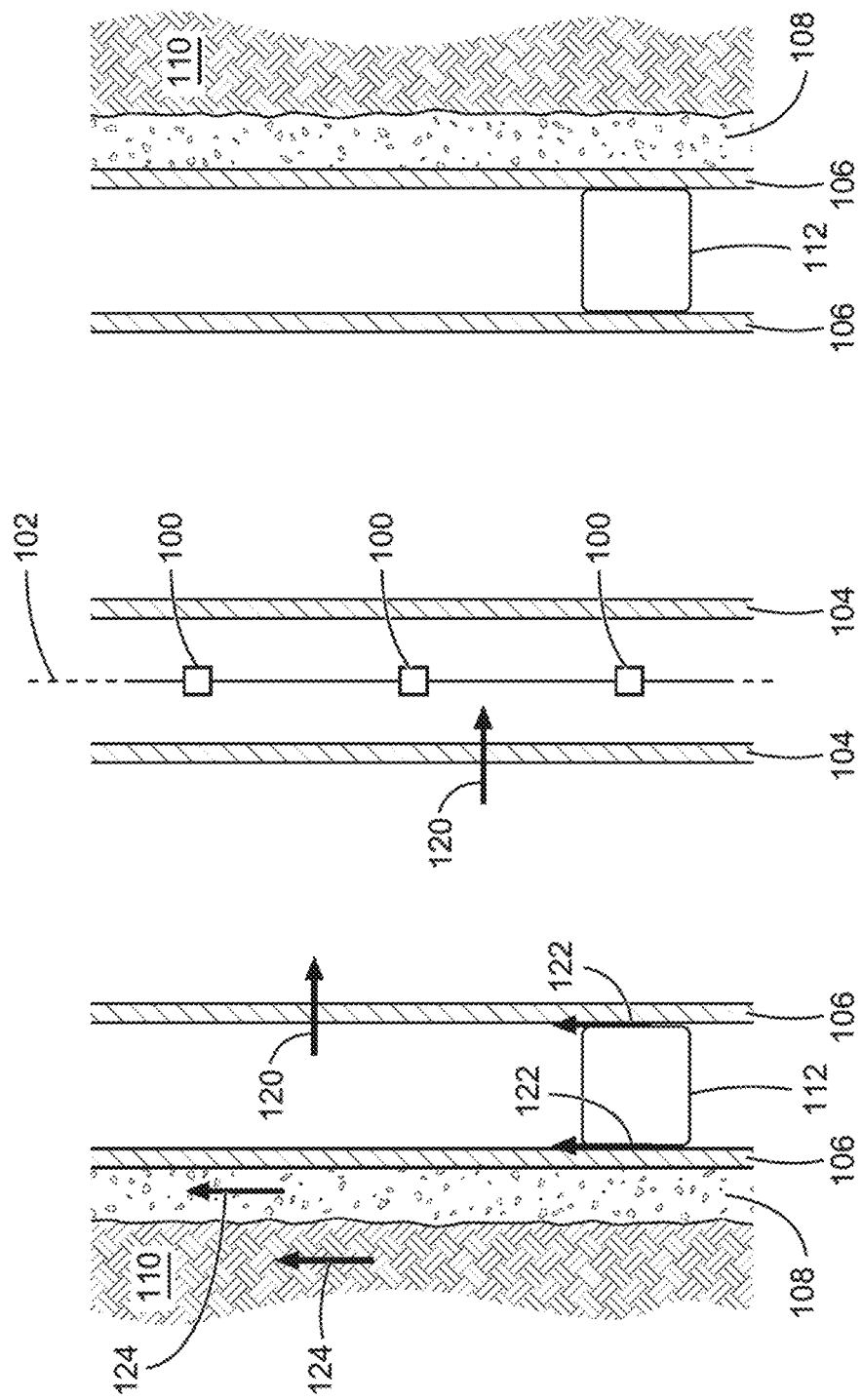
FIG. 1 is a schematic cross-sectional depiction of an example acoustic-sensor array deployed within a wellbore, in accordance with various embodiments.

FIG. 1 illustrates an example acoustic-sensor array deployed within a wellbore, in accordance with various embodiments. As shown, the sensors 100 may be arranged linearly along the longitudinal axis 102 of the wellbore (whose radial coordinate is zero). They may be uniformly spaced (as shown), or have varying spacings between adjacent sensors. The sensor environment generally includes multiple physical barriers to fluid flow, such as the production tubing 104 through which oil or gas may be pumped up and out of the well, one or optionally multiple nested well casings 106, and a cement sheath 108 filling the space between the casing(s) 106 and the formation 110 surrounding the wellbore. Additionally, the wellbore may be divided into multiple vertical sections, e.g., by packers 112 between the casings 106 that may separate, e.g., a lower, perforated portion of the tubing where hydrocarbons enter from an upper (non-perforated) portion serving as an upward conduit. Unintended flow scenarios that can occur in such a configuration include, e.g., flows across the casing 106 or tubing 104 due to cracks or holes therein (indicated by arrows 120), flows past a packer 112 between adjacent vertical wellbore sections due to insufficient sealing (indicated by arrows 122), and flows within the formation 110, cement sheath 108, or other layer more or less parallel to the layer boundaries (indicated by arrows 124). As these flows pass through restricted paths, acoustic signals can be generated as a result of the accompanying pressure drops. The acoustic signals propagate generally in all direction through the formation and/or borehole, eventually being detected at the various sensor locations.

Acoustic sensors suitable for use in embodiments hereof include, for example and without limitation, (piezoelectric) hydrophones, FBG sensors, or segments of a distributed fiber-optic cable. In various embodiments, the acoustic sensors are omnidirectional, i.e., unable to discriminate by themselves between different incoming directions of the signal. By exploiting the spatiotemporal relations between the signals received from the same source at multiple sensors, however, information about the signal direction and/or source location can be obtained. For example, by using at least three sensors in a linear arrangement along the wellbore axis, as shown in FIG. 1, it is possible, at least under certain conditions, to determine the depth and radial distance of the source (as further explained below). To further localize the source in the azimuthal direction, the configuration of the sensor array may be modified, e.g., by placing different sensors at different radial positions or otherwise arranging them two- or three-dimensionally, by partially shielding sensors to limit their detection to certain azimuthal windows (different ones for different sensors), or by using directional sensors (i.e., sensors that inherently provide directional information). (As a practical matter, a linear configuration as shown in FIG. 1 may be the consequence of the spatial confines imposed by the tubing 104 in which the sensors are mounted.)

The acoustic signals detected substantially simultaneously (or, more generally, with known temporal relations therebetween) by the individual sensors 100 may be combined (or "fused") into a single signal, e.g., by forming a linear combination that approximates the signal as emitted by the source (or a combination of multiple sources). "Substantially simultaneously" herein indicates that the time intervals over which signals are collected overlap significantly (e.g., by at least 90%, preferably at least 99%) between the different sensors. Since time shifts between the different sensors due to different travel times from the source to the sensors are generally small (e.g., on the order of one millisecond) compared to the total signal-collection interval (e.g., on the order of 100 ms), significant overlap in the collection intervals generally ensures that the emission time periods corresponding to the measured signals likewise overlap significantly, facilitating array-signal processing. In the (rare) event that time shifts between the different sensors are significant in comparison to the overall collection interval, they can be compensated for by shifting the collection intervals between the various sensors accordingly so as to ensure that all sensors measure substantially the same emission time period.

Figure 2:
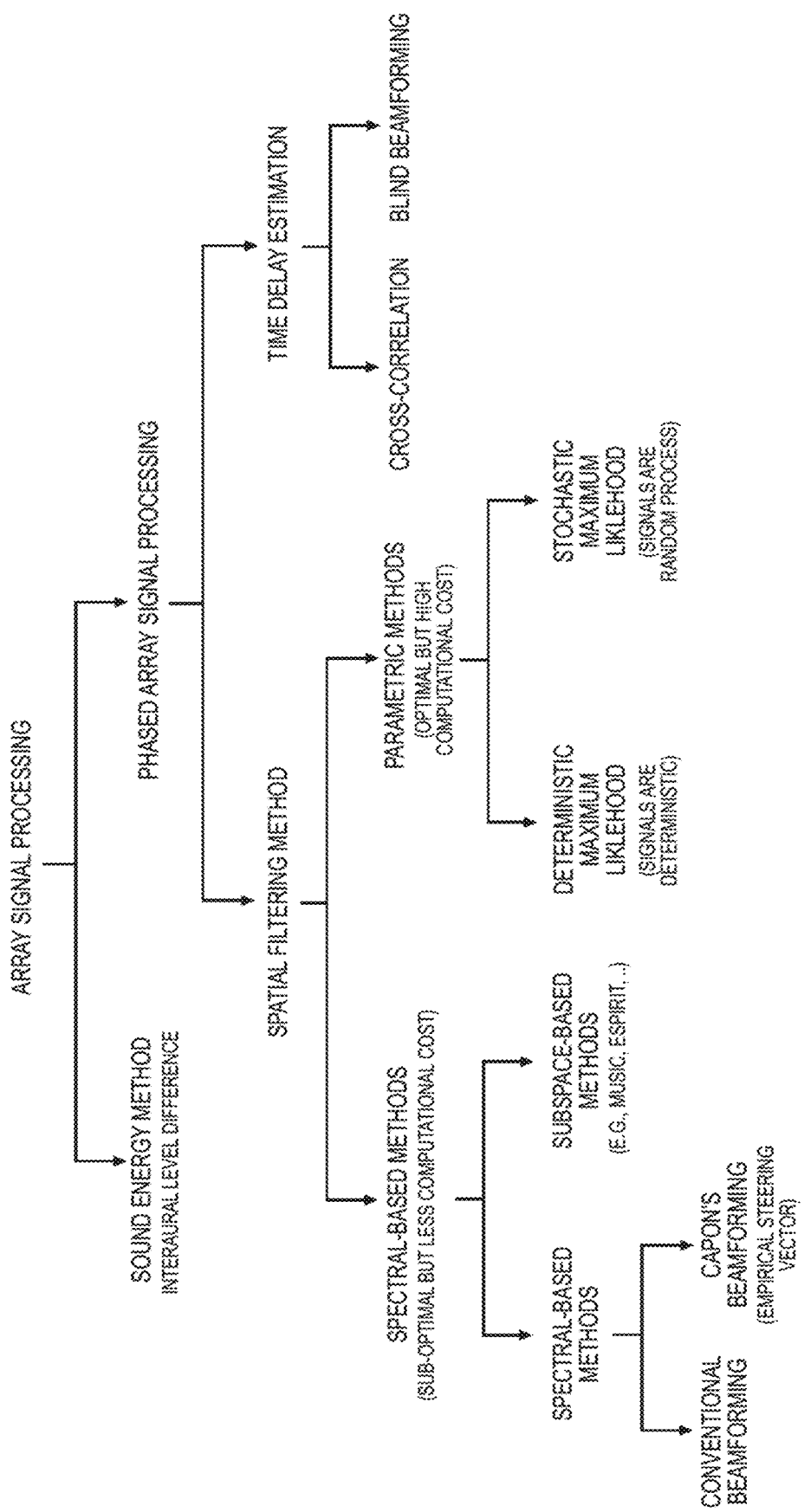
FIG. 2 is a chart of various array-signal-processing methods in accordance with various embodiments.

Signal fusion can generally be accomplished by so-called array signal processing. Array-signal-processing techniques known in the art include various spatial filtering methods (also often referred to as "beamforming" methods), such as conventional beamforming, Capon's beamforming, Multiple Signal Classification (MUSIC), and various parametric methods, as well as time-delay estimation. In various embodiments, a spatial-filtering (beamforming) or other array-signal-processing method is employed to fuse the various simultaneously acquired sensor signals (whereby, at the same time, the acoustic source may be localized). FIG. 2 provides an overview of various possible array-signal-processing techniques.

Array-signal-processing methods generally rely on a forward model of wave propagation from the source(s) to the sensors to solve the inverse problem, i.e., to determine the source signal from the signals received at the sensors. In traditional application contexts, such as radar and sonar, this forward model is generally straightforward because wave propagation occurs in a uniform (homogenous and isotropic) medium (e.g., air or water) and the source can be assumed, as a practical matter, to be far away from the sensors. When fluid flows in and surrounding a wellbore are to be measured, however, the uniform-medium and far-field assumptions generally break down. Accordingly, in various embodiments, the forward model is adjusted to account for the configuration of the wellbore and surrounding formation (which collectively include various propagation media and boundaries therebetween) and their effect on the wave field (e.g., wave refractions, reflections, and resonances), as well as to facilitate the processing of near-field signals (i.e., signals originating from a source whose distance from the sensors is not significantly (e.g., orders of magnitude) larger than the spatial extent of the sensor array).

Figure 3:
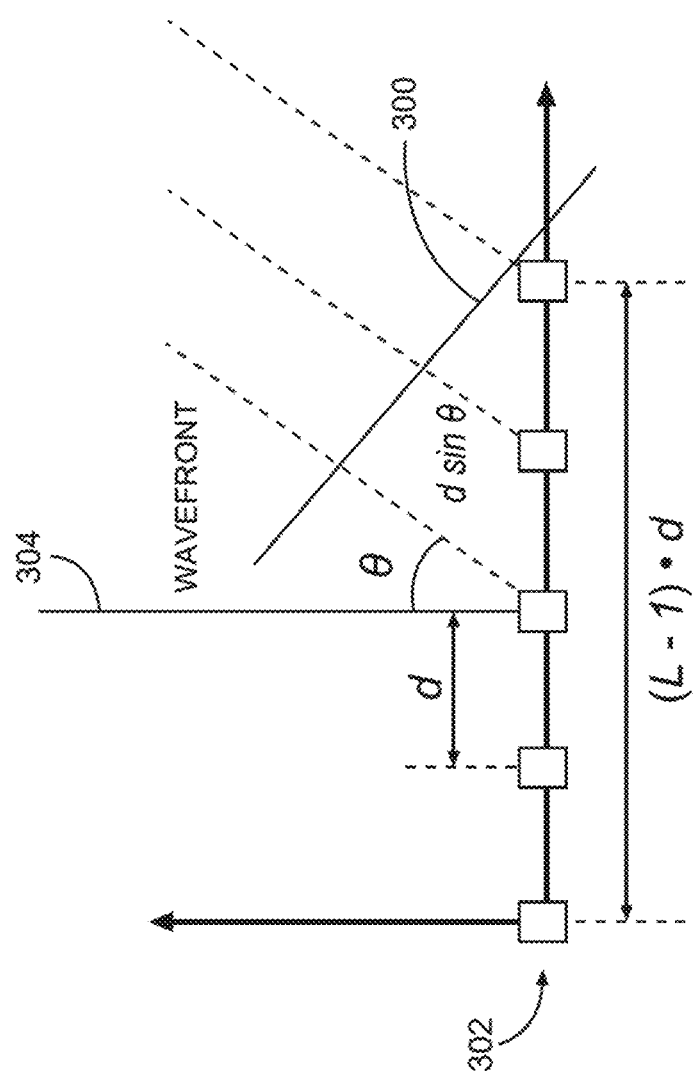
FIG. 3 is a schematic diagram of a planar wavefront impinging on a linear acoustic sensor array, illustrating receipt of a far-field acoustic signal.

To illustrate the principle underlying spatial filtering methods, consider a narrowband, far-field acoustic source s(t). FIG. 3 is a schematic diagram of a planar wave 300 impinging on a linear acoustic sensor array 302, as may be received from such a far-field source. The acoustic waves emitted from the source impinge on the linear array 302 at an angle θ with respect to the normal 304 to the array, such that the sensors within the array 302 measure signals (expressed as a vector X(t)):

$$X(t) = a(\theta)s(t) + n(t),$$

where a(θ) is a complex-valued vector expressing the amplitude attenuation and phase shift undergone by the signal on its path from the source to the respective sensors (which depends on the source location relative to the sensor), and n(t) is a vector expressing the contribution of noise. Conversely, an unknown source signal can be estimated by fusing the measured signals, in accordance with:

$$y(t) = \frac{1}{L}\sum_{i=1}^{L} a_i(\theta) \cdot x_i(t) = \frac{a^H(\theta)}{L} X(t).$$

where L is the number of sensors and the superscript H denotes the conjugate transpose (i.e., the Hermitian). The vector $a(\theta)$ encapsulates the forward model of phase propagation, and is often referred to as the steering vector. In the simple case of a uniform medium in which the waves travel at a constant speed of sound c, with a wave vector $k=\omega/c$, $a(\theta)$ takes the form:

$$a(\theta) = [1 e^{-ikd \sin \theta} \ldots e^{-i(L-1)kd \sin \theta}]^T,$$

where d is the distance between adjacent sensors of a uniform array.

More generally, array signal processing involves expressing the fused signal y(t) as a weighted linear combination of the measured signals, $$y(t) = \sum_{i=1}^{L} w^*_i x_i(t) = w^H X(t),$$

and determining the complex-valued weight vector w based on a suitable heuristic. For example, in conventional beamforming, the weights are selected to maximize the output power P(w) of the fused signal at a given incident angle $\theta$:

$$P(w) = \frac{1}{N} \sum_{i=1}^{N} |y(t)|^2 = \frac{1}{N} \sum_{i=1}^{N} w^H X(t) X^H(t) w = w^H \hat{R} w,$$

where $\hat{R}$ is the sample covariance matrix $$\hat{R} = \frac{1}{N} \sum_{i=1}^{N} X(t) X^H(t).$$

The resulting optimization problem takes the form $$\max_w E\{w^H X(t) X^H(t) w\} = \max_w \{E[|s(t)|^2] \cdot |w^H a(\theta)|^2 + w^H C_n w\}$$

subject to the constraint, $|w|=1$. Herein, E denotes the expectation value. The non-trivial solution to this problem is:

$$w = \frac{a(\theta)}{a^H(\theta) a(\theta)} = \frac{a(\theta)}{L}.$$

As another example, in Capon's beamforming method, the optimization problem takes the form $$\min_w E\{w_H X(t) X^H(t) w\} = \min_w \{E[|s(t)|^2] \cdot |w^H a(\theta)|^2 + C_n w\}$$

subject to the constraint $|w^H a(\theta)|=1$. This method fixes the gain at the incident angle $\theta$ and minimizes the noise contribution. The solution is:

$$w = \frac{\hat{R}^{-1} a(\theta)}{a^H(\theta) \hat{R}^{-1} a(\theta)}.$$

As can be seen, Capon's method incorporates the data (reflected in the sample covariance matrix $\hat{R}$) with the a-priori known forward model, and is thus one example of so-called "adaptive" spatial filtering methods. Additional methods (e.g., as summarized in FIG. 3) are known to those of ordinary skill in the art.

The above-described spatial-filtering methods apply under the assumption that the source signal is far away from the sensor array (far-field assumption) such that the time delays of individual sensors are a function of the incident angle $\theta$ only. To process near-field signals and further to include the effects of different media between the source and sensor array (e.g., as depicted in FIG. 1), the steering vector $a(\theta)$ is suitably modified, in accordance with various embodiments, to become a function $a(\theta, r_{spherical})$ of $\theta$ and the range $r_{spherical}$ of the source, i.e., the distance of the source from the sensor in spherical coordinates (which differs from the perpendicular radial distance of the source from the wellbore axis). The modified steering vector $a(\theta, r_{spherical})$ may depend on a configuration and condition of the wellbore and surrounding formation, taking into account, e.g., the geometry and material properties of various layers and their effect on sound propagation (e.g., the resulting sound velocities in rock, mud, cement, etc.). Further, to process broadband signals, the measured signals are divided into narrow spectral bands, and following processing of the narrowband signals, the results are combined in manners well-known to those of ordinary skill in the art.

Detecting the source of an acoustic signal involves, in accordance with various embodiments, fusing the signals received by the individual sensors of the array for a plurality of putative acoustic-source locations within a predefined two-dimensional region (that, e.g., spans a certain length in the depth direction and extends to a certain radial distance from the wellbore) and compute an acoustic-source energy level, amplitude, or other fused-signal parameter as a function of the acoustic-source location from the fused signals. For putative source locations across a range of depths and radial distances, this results in a two-dimensional map of the fused-signal parameter.

Figure 4A:
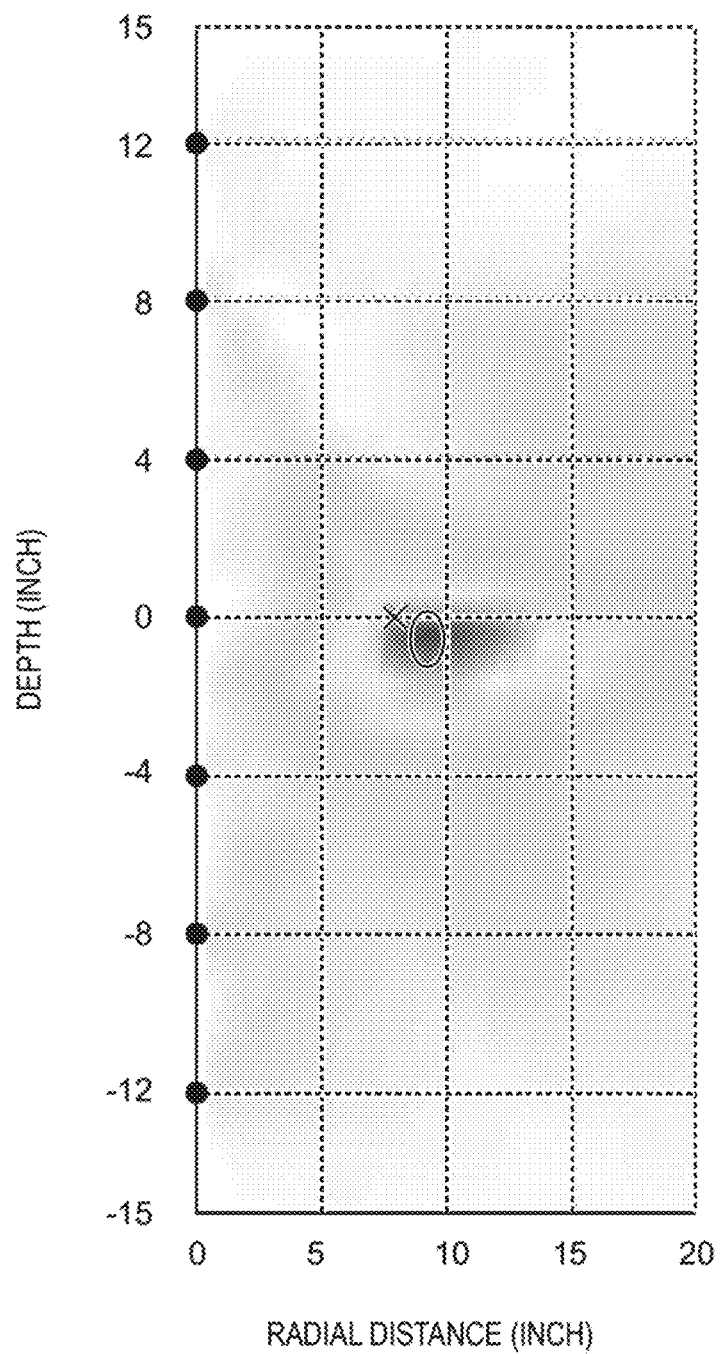
FIG. 4A is an example map of an acoustic-source energy level as a function of depth and radial distance, determined by array signal processing in accordance with various embodiments.

FIG. 4A is an example map of an acoustic-source energy level as a function of depth and radial distance, determined by array signal processing from acoustic signals acquired by a sensor array including seven uniformly spaced sensors. The sensor locations are indicated by the dots on the depth axis, and the location of the acoustic source is indicated by the cross. The grey-scale value of the map indicates the energy level of the fused signal, corresponding to the acoustic-source energy level, as calculated by array signal processing, at the putative locations. As can be seen, the computed energy level peaks in the vicinity of the actual acoustic source location. In the absence of a significant acoustic signal source, the map will show only low energy levels. In the case of multiple acoustic sources, the map will show high energy levels at multiple locations. Accordingly, acoustic-signal detection and processing in accordance herewith may facilitate simultaneously detecting multiple flows.

From a fused-signal map such as that depicted in FIG. 4A, the actual source(s) and its (or their) location(s) can be determined by identifying the local maximum (or multiple local maxima) of the acoustic source energy level or other fused-signal parameter. The magnitude of the local maximum can be used to infer whether the identified acoustic source indeed corresponds to an underground flow. For instance, in some embodiments, statistical methods are employed to detect underground flows based on fused acoustic signal maps by discriminating between flow and non-flow scenarios. For this purpose, a library of fused signals for various non-flow scenarios and a library of fused signals for various flow scenarios (including, e.g., different types of flows, such as oil, gas, and water flows, and different flow rates or other flow parameters) may be established. The data for non-flow scenarios may be collected from historical logging data or during flow-detection logging in real time in situations where the absence of a flow can reasonably be assumed, e.g., logging in a newly completed well. The data for flow scenarios may be collected from logging data of confirmed flow cases, such as leaks through casing. From the libraries, a suitable flow-detection threshold for a binary hypothesis test or similar statistical test may be derived.

Figure 4B:
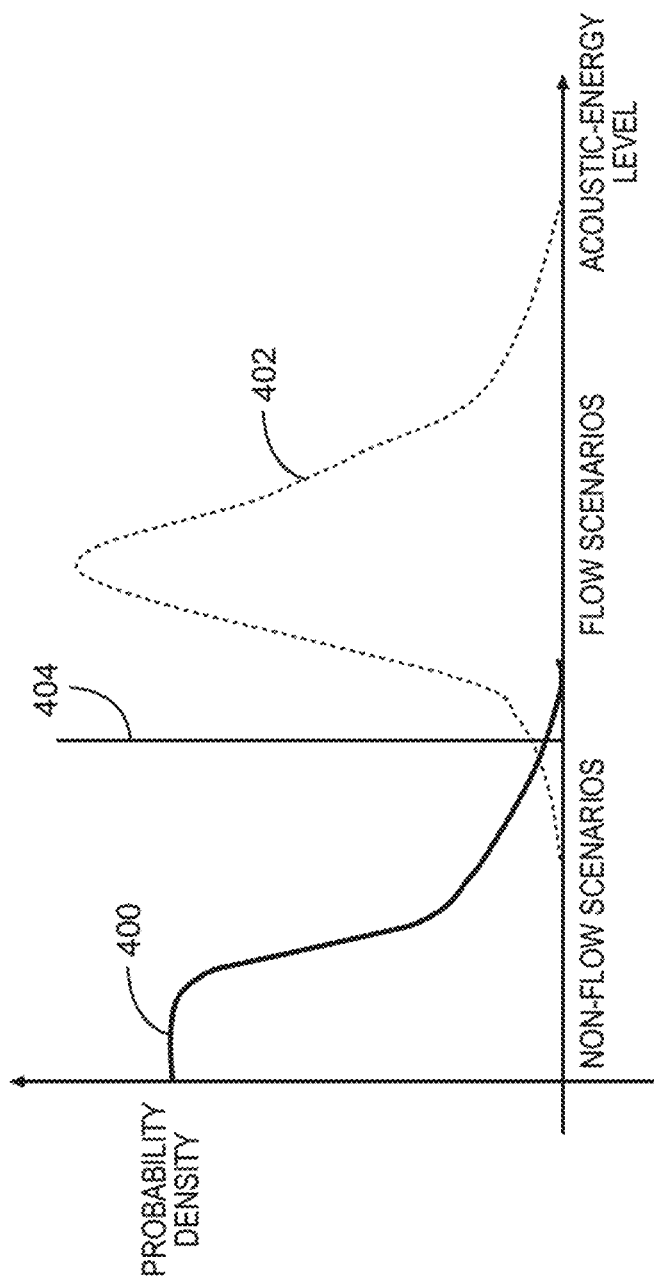
FIG. 4B is a graph of probability densities for flow and non-flow scenarios, illustrating a binary hypothesis test for flow detection, in accordance with various embodiments.

FIG. 4B illustrates the binary-hypothesis test with example probability distributions for non-flow and flow scenarios as a function of the acoustic source energy level (of a local maximum in a two-dimensional map, e.g., as shown in FIG. 4A). Integrating the non-flow curve 400 from zero to a specified energy level yields the cumulative probability that, if there is no flow, the energy level of the fused signal falls below the specified energy level. Similarly, integrating the flow curve 402 from zero to a specified energy level yields the cumulative probability that, if there is flow, the energy level of the fused signal falls below the specified energy level. As shown, the acoustic energy level tends to be higher under flow conditions; however, there may be some overlap in the energy levels that correspond to flow and non-flow scenarios. A detection threshold 404 may be set in this overlap region, e.g., based on statistical metrics such as a false-alarm rate. Applying the binary-hypothesis test, if a measured signal level exceeds the threshold 404, a flow condition is assumed to exist. If the signal falls below the threshold 404, it is assumed that there is no flow. Integrating the flow curve 402 from the detection threshold 404 to infinity yields the sensitivity (probability of true positives) of the test, whereas integrating the flow curve 402 from zero to the detection threshold 404 yields the probability for missed flows (false negatives). Integrating the non-flow curve 400 from zero to the detection threshold 404 yields the specificity (probability of true negatives) of the test, whereas integrating the non-flow curve 400 from the detection threshold 404 to infinity yields the false-alarm probability (false positives).

Once an acoustic source has been identified, its associated fused signal y(t) can be analyzed (e.g., in the time domain or, after Fourier transform, in the frequency domain) to extract certain specified features indicative of various types of flows or different flow magnitudes. Relevant and distinct features may be identified based on training data—e.g., as acquired from laboratory experiments or over time during field tests—using systematic methods for designing feature-based classification and estimation tests, as are well-known to those of ordinary skill in the art.

Figure 5A:
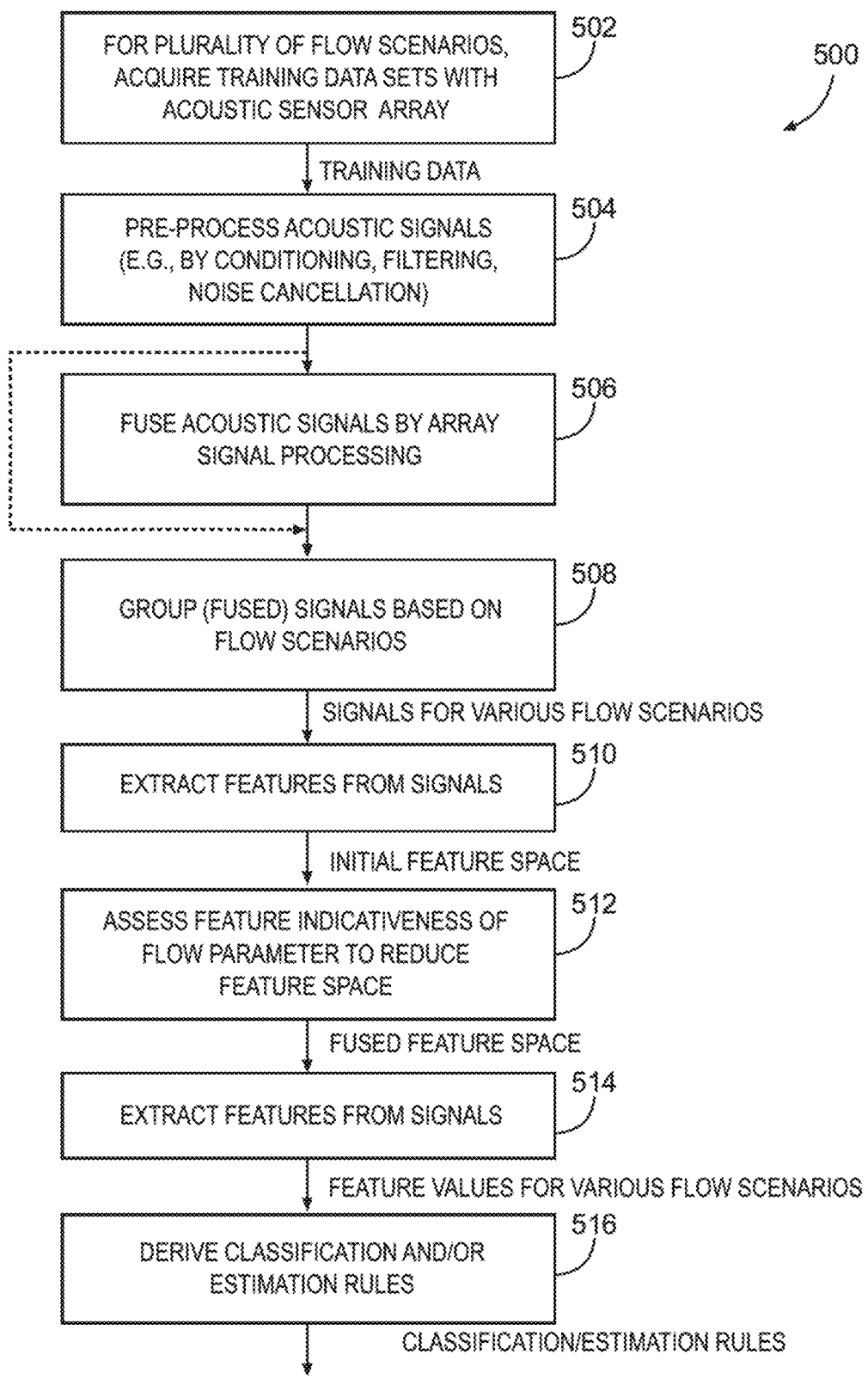
FIG. 5A is a flow chart of a method for extracting features indicative of a type of flow or a quantifiable flow parameter from a fused signal and designing a classifier or estimator based thereon, in accordance with various embodiments.

FIG. 5A illustrates, in the form of a flow chart, a method 500 for identifying suitable features and creating classification and estimation rules based on a set of labeled training data, i.e., measured acoustic signals for a variety of flow scenarios of various known types and flow parameter value(s), including non-flow scenarios. The method involves acquiring, for the known flow scenarios, the associated training data sets with the array of acoustic sensors (operation 502); pre-processing the data through signal conditioning on each channel (where different channels correspond to different sensors), filtering (e.g., high-pass filtering), noise cancellation, and the like (operation 504); and combining the individual channels into a single fused signal using array signal processing as described above (operation 506). The fused signals may then be grouped based on the flow scenarios (e.g., flow vs. non-flow; various leak types, such as oil, gas, water, particle, or multi-phase leaks; or flows of different magnitudes) to which they belong (operation 508).

From the fused signals, features are then extracted for an initially large-dimensional feature space (operation 510), which is thereafter collapsed, based on an assessment of the indicativeness of each feature of the flow type or flow parameter of interest, into a much lower-dimensional feature space—a process also referred to as feature-level fusion (operation 512). (Herein, one or more of the flow-scenario types may correspond to the absence of a flow.) Feature-level fusion serves to remove potentially redundant information in the original feature space and retain only independent information. For classification tasks, the idea is to separate feature values in the fused feature space with respect to the types of flows. Here, we assume that different types of flows will result in different feature values. If two different types of flows have the same value for a certain feature, this feature is either not appropriate, or those two types of flows are inherently not classifiable based on the information contained in the received signals. In the former case, feature extraction and fusion (operations 510, 512) can be repeated to identify features that contain classifiable information. For flow-parameter (e.g., flow-rate) estimation, the idea is to identify features whose values are correlated with the flow parameter. Various methods for the extraction of representative, distinct features from the large number of initial features are well-known to those of ordinary skill in the art and can be implemented without undue experimentation; these methods include, without limitation, signal-energy analysis, spectral-profile analysis, and time-frequency analysis, machine learning, principle component analysis, independent component analysis, neural-network-based methods, and Bayesian methods.

Following feature-level fusion (operation 512), the feature values for the extracted distinct features are computed (if they have not yet been already) and associated, or "labeled," with the flow-scenarios to which they belong (operation 514). Statistical classification and estimation methods can then be used to derive, from the labeled feature values, rules (including, e.g., thresholds) for waveform classification and estimation (operation 516). Suitable methods for classification include the Bayes test and Neyman-Pearson test, for example. Flow-rate estimation can be accomplished using Bayes estimation or maximum likelihood estimation, for instance. Both classification and estimation rules can, alternatively, be derived employing a machine-learning approach. In supervised machine learning, training data including pairs of input and labeled output is used; common methods include neural networks, perceptron, support vector machine, etc. In unsupervised machine learning, the underlying structure of the data is ascertained automatically from the data itself, and the data is classified accordingly; common methods include self-organizing map, K-means clustering, hierarchical clustering, novelty detection, etc. As yet another alternative, the rules can be derived by model fitting, such as, e.g., logistic regression.

Figure 5B:
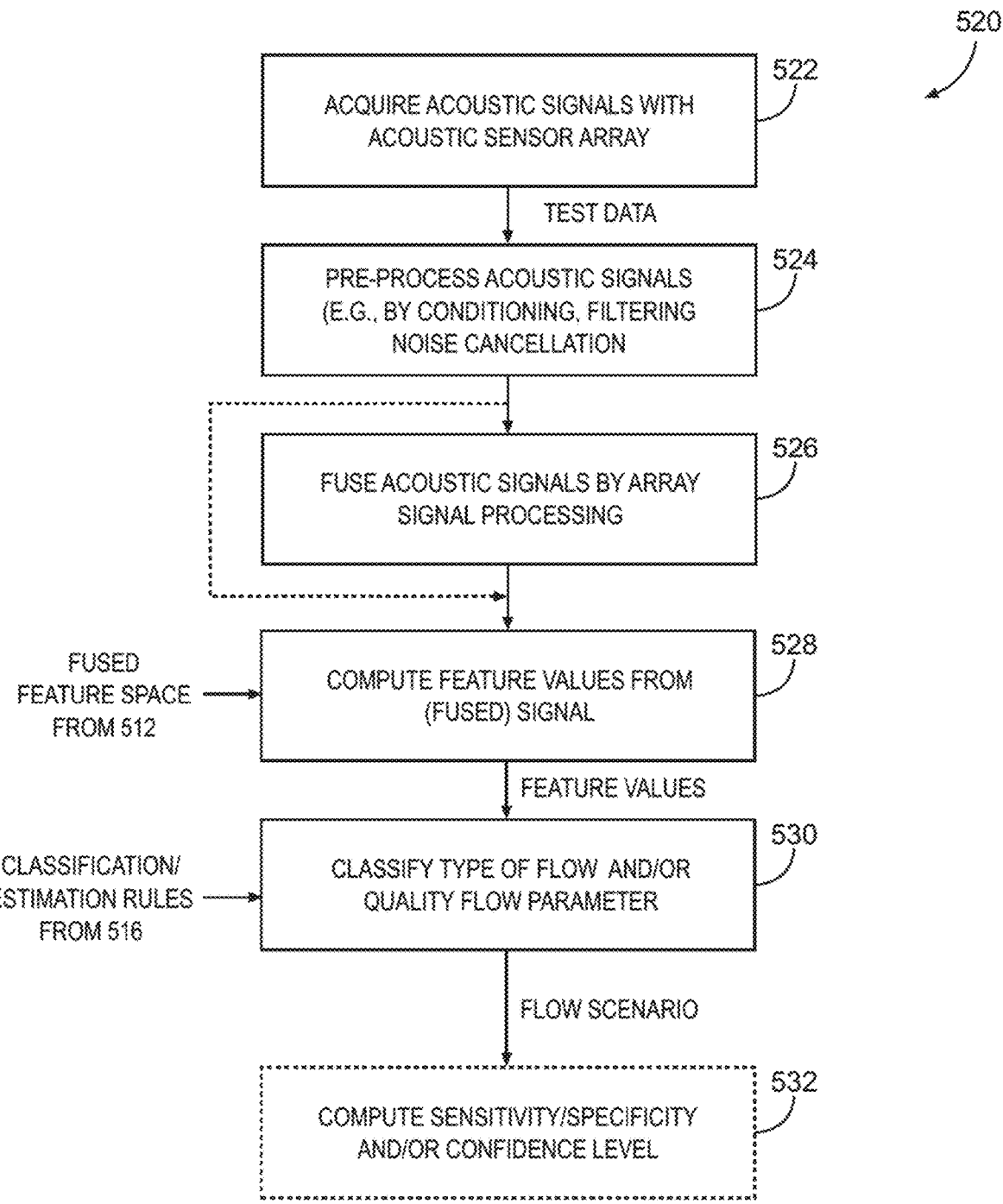
FIG. 5B is a flow chart of a method for applying the classifier or estimator of FIG. 5A to features extracted from a fused signal to determine the type of flow or quantify the quantifiable parameter, in accordance with various embodiments.

Once the statistical classifiers and estimators have been designed based on training data for various known flow scenarios (of different types) and one or more known non-flow scenario(s), they can be applied, as illustrated in FIG. 5B, to test data. As shown, a method 520 for classifying a detected flow and estimating one or more flow parameters of the flow may involve acquiring acoustic signals with the array of acoustic sensors (operation 522); pre-processing the data (through signal conditioning, filtering, noise cancellation, etc.) (operation 524); and combining the individual channels into a single fused signal using array signal processing as described above (operation 526). Then, feature values for the features identified as indicative of the flow types and parameters of interest (i.e., the features of the low-dimensional feature space created in method 500) are computed (operation 528) from the fused signal, and the classification or estimation rules determined in operation 516 are applied to the computed feature values (operation 530) to determine the type of leak/flow or quantify the flow rate or other parameter. In addition to classifying and/or quantifying the detected flow, the sensitivity and/or specificity of the classification and/or the confidence level of the estimation may be computed (operation 532) from laboratory or field test data where the true flow type and flow parameter(s) are known. Accompanying the type of flow with the sensitivity/specificity of the classification and the flow parameter with the confidence level provides users of the information with a metric of its reliability, enabling them to act appropriately. For example, if the flow rate associated with a detected leak has a low associated confidence level, additional or complementary measurements and tests may be performed.

As will be readily appreciated by those of ordinary skill in the art, feature extraction as described above may, in principle, also be performed on the individual sensor signals, as indicated by the dotted lines in FIGS. 5A and 5B. Using a fused signal may, however, result in better performance of the classifiers and estimators because fusing the signals will generally improve the input in terms of its fidelity to the true source signal.

Figure 6A:
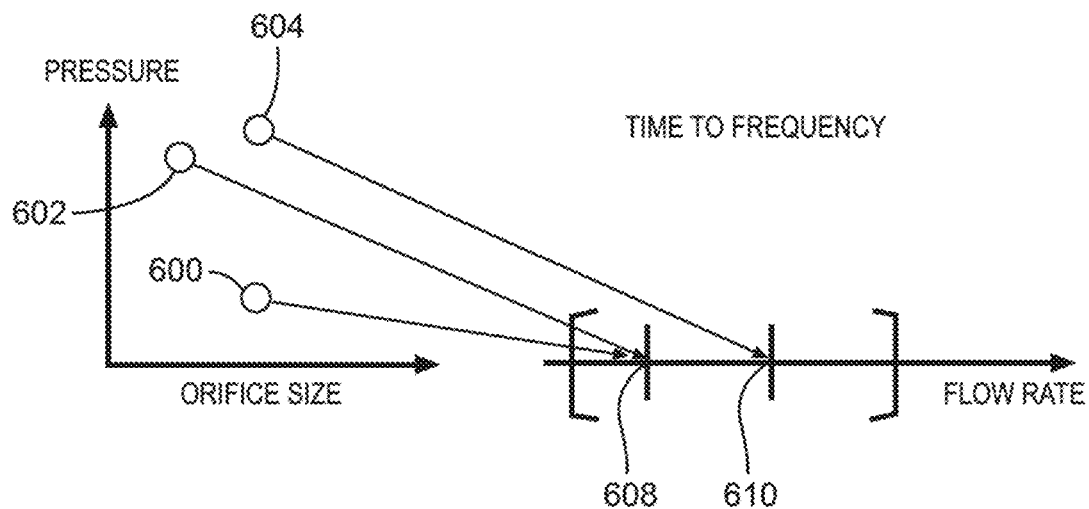
FIG. 6A is a graph of pressure/orifice combinations and associated flow rates for three example flow scenarios in accordance with various embodiments.
Figure 6B:
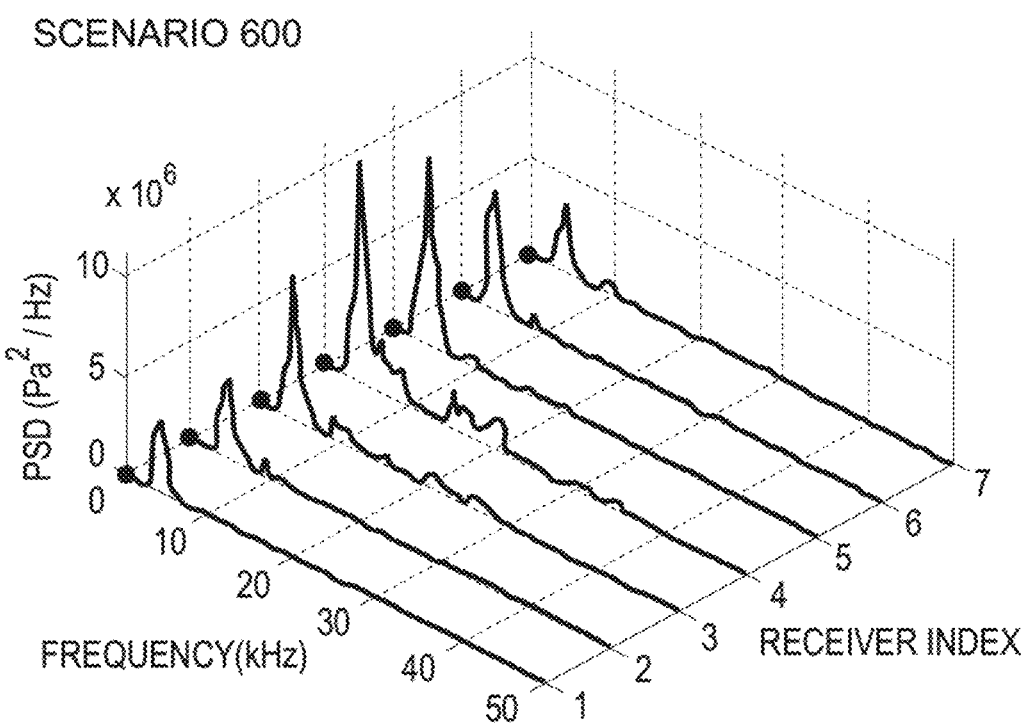
FIGS. 6B-6D are three-dimensional graphs of example acoustic signals acquired for the three flow scenarios indicated in FIG. 6A, in accordance with various embodiments.
Figure 6C:
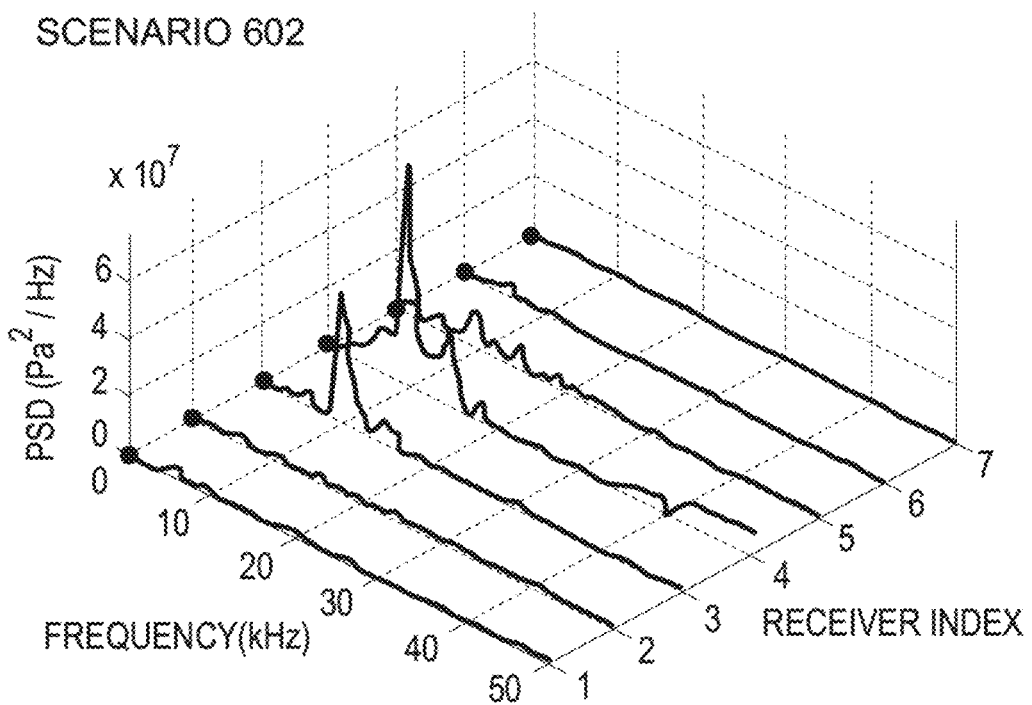
Figure 6D:
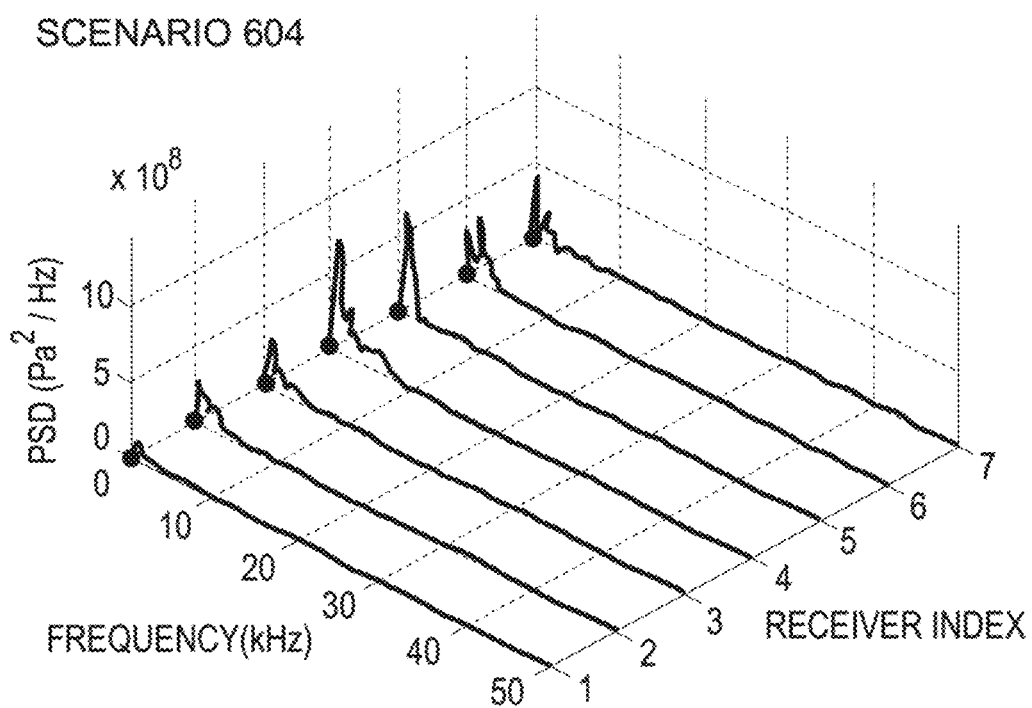
Figure 6E:
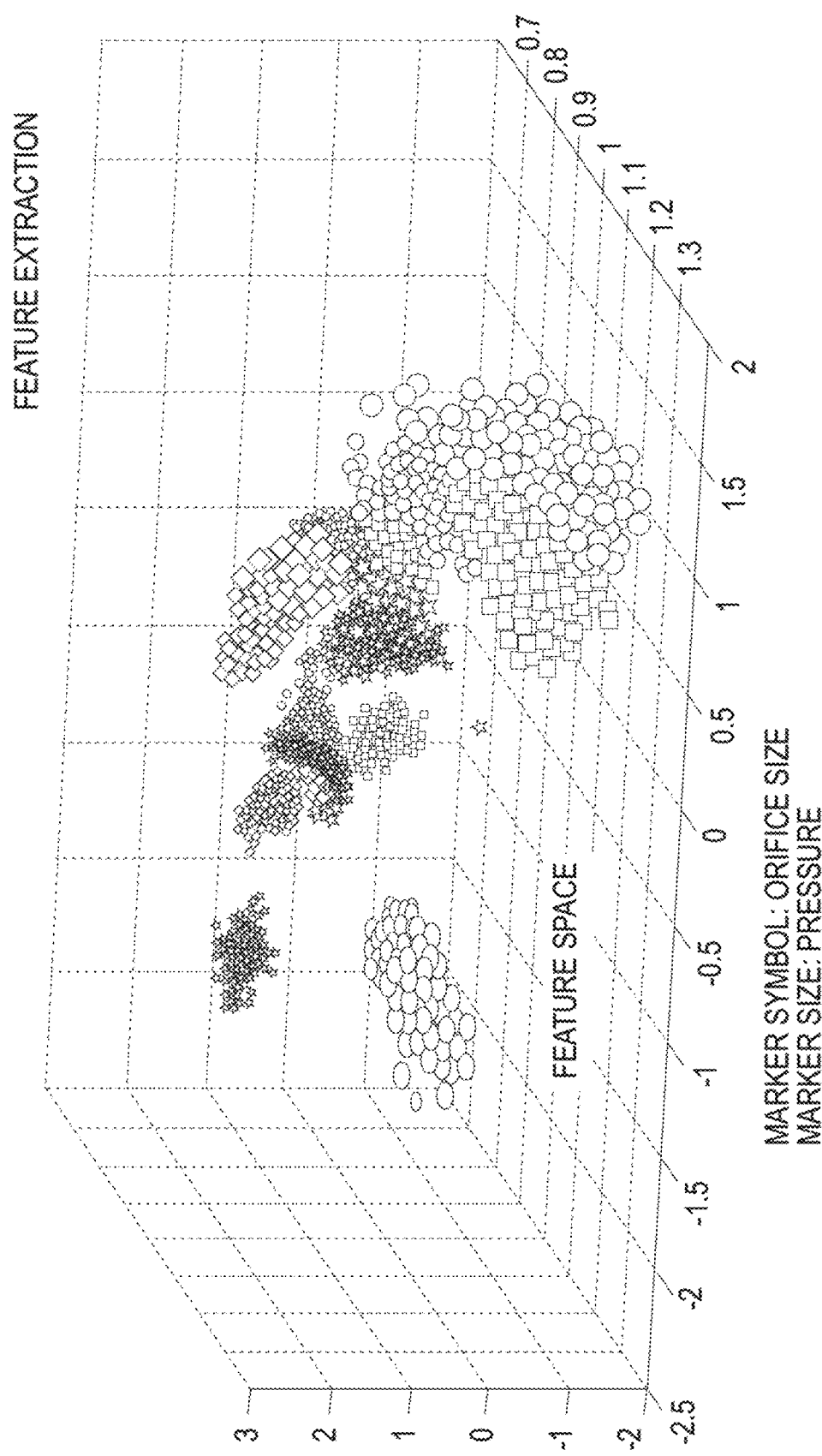
FIG. 6E is a three-dimensional graph of feature values for tens of fused signals for several flow scenarios, illustrating the separability of various flow parameters in a low-dimensional feature space, in accordance with various embodiments.

Refer now to FIGS. 6A-6E and 7A-7E, which evidence the feasibility of methods in accordance herewith for leak quantification based on experimental data. FIG. 6A illustrates three flow scenarios 600, 602, 604 corresponding to different combinations of the size of the orifice through which the flow passes and the pressure drop across the orifice. Note that different combinations of pressure and orifice size can result in the same flow rate. For instance, a first flow rate 608 can result from a larger orifice size in conjunction with a smaller pressure (scenario 600) or from a smaller orifice size in conjunction with a larger pressure (scenario 602), and a second, higher flow rate 610 can result from the larger orifice size in conjunction with a large pressure (scenario 604). FIGS. 6B-6D show acoustic signals acquired by an array of seven sensors for the three flow scenarios 600, 602, 604, respectively. For each of the three flow scenarios 600, 602, 604, a fused acoustic signal can be derived from the seven individual sensor signals. FIG. 6E depicts, within a three-dimensional feature space, feature values for many tens of fused signals, acquired for several flow scenarios. Data for different orifice sizes are depicted with different types of symbols, and data for different pressures are depicted with different symbol sizes. As can be seen, both different orifice sizes and different pressures, and thus also different flow rates, are visually separable in the graph, enabling flow characterization based on the extracted features.

Figure 7A:
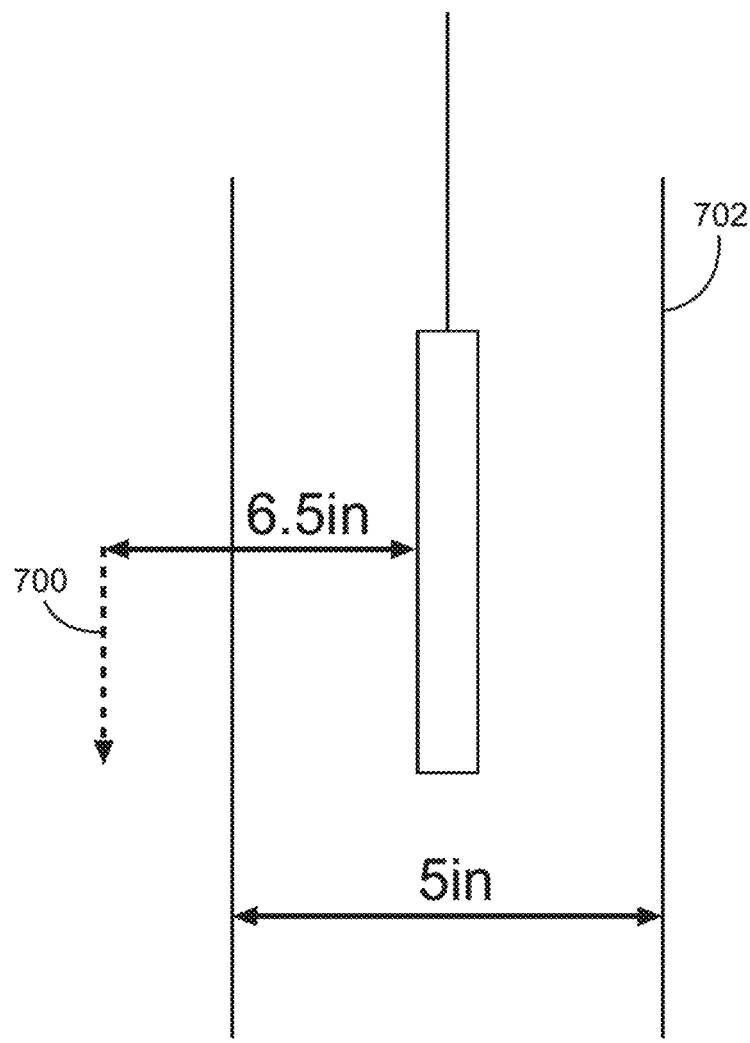
FIG. 7A is a schematic diagram of an example test setup for quantifying a water leak, in accordance with various embodiments.
Figure 7B:
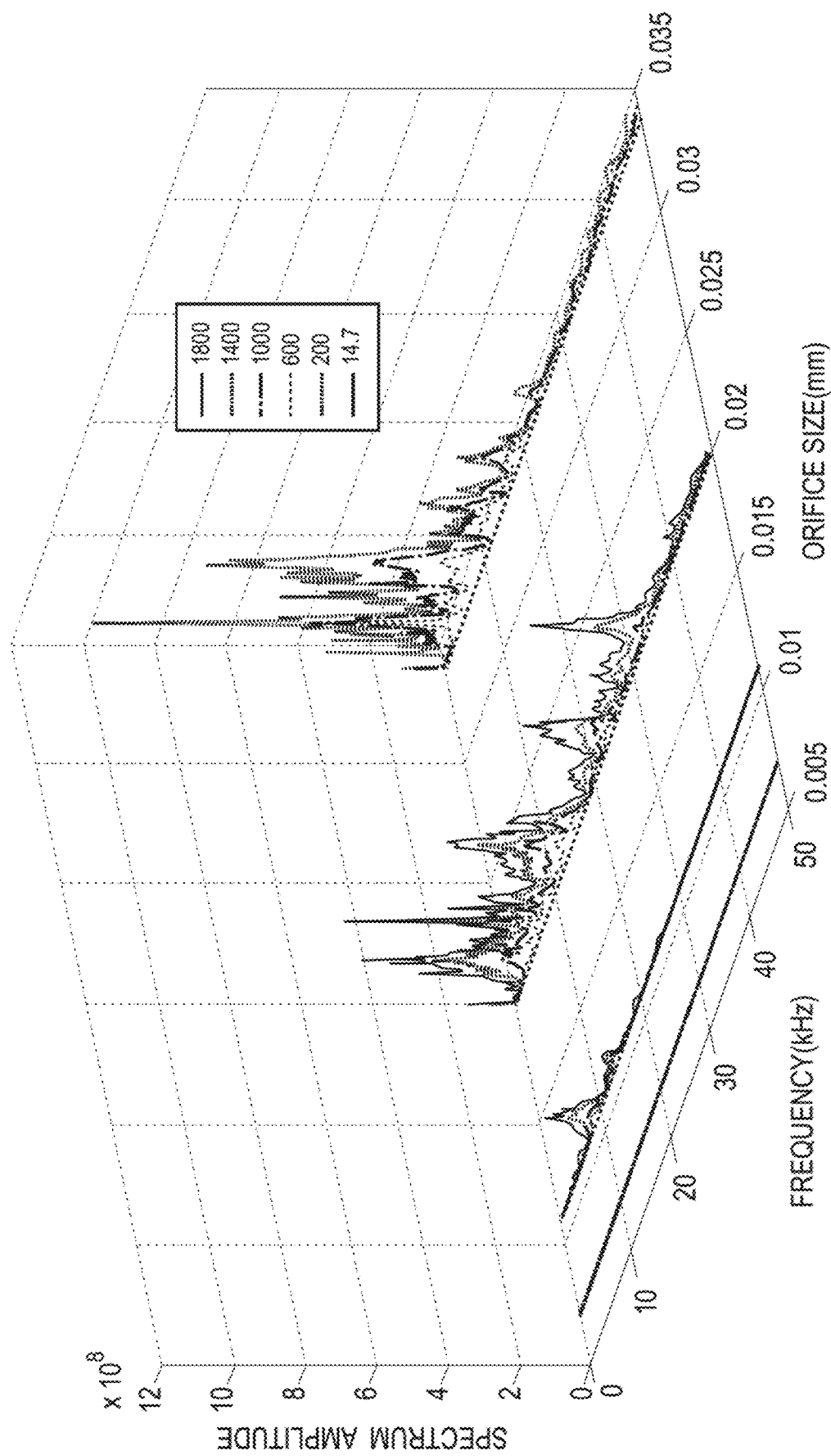
FIG. 7B is a three-dimensional graph of example acoustic signals acquired for various pressure/orifice combinations using the test setup of FIG. 7A, in accordance with various embodiments.

FIGS. 7A-7E provide another example of flow-rate estimation in accordance with various embodiments. FIG. 7A shows a test setup for quantifying a water leak, in which a water jet 700 is flowing downward outside a 5" casing 702, at a distance of 6.5" from the center of the casing 702. FIG. 7B shows the spectra of signals measured for twenty-three different combinations of the orifice size of the water jet and the differential pressure across the orifice. Principal component analysis can be applied to reduce the dimensionality of the data, initially including 1024 samples per spectrum, to two numbers for each spectrum. FIG. 7C shows the data in the resulting two-dimensional feature space. As can be seen, the twenty-three data points are separable into two groups, corresponding to a small flow rate and a large flow rate, which are separated by a threshold. A logistic regression model can be applied to the data in the two-dimensional feature space, and the fitted model can be verified by cross validation. FIGS. 7D and 7E illustrate the specificity and sensitivity, respectively, as determined by "leave-four-samples-out" cross validation, where four randomly picked data points are used as test data to validate the model fitted on the other 19 data points, and the procedure is repeated for all possible selections of the four test data points. As shown, a specificity of 98.5% and a sensitivity of 100% can be reached in the illustrated example.

Figure 8:
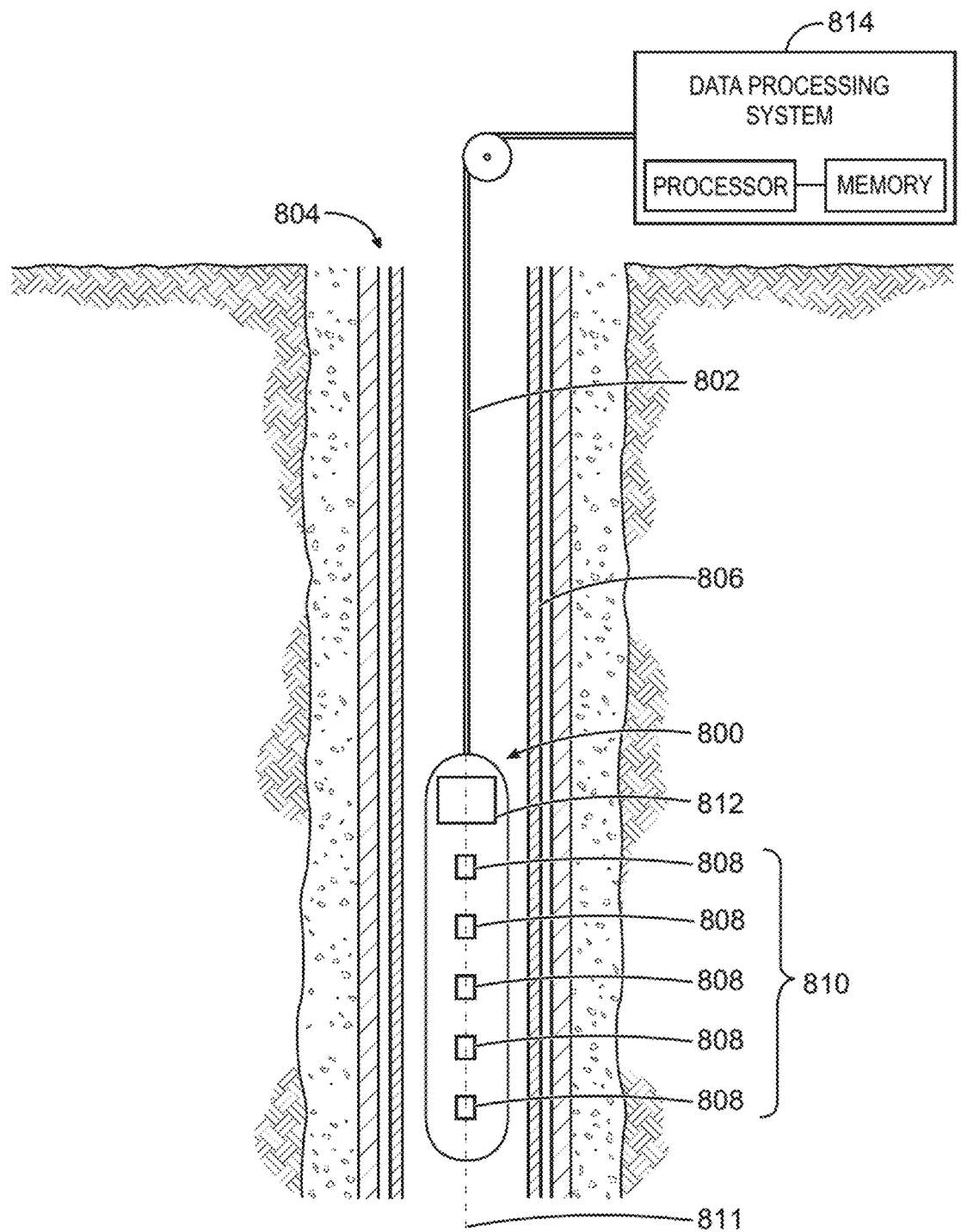
FIG. 8 is a schematic diagram of an example system for acoustic-source detection, localization, and characterization in a wireline well-logging embodiment.

The detection and characterization of underground acoustic sources (and, thus, underground flows) in accordance herewith can be implemented in both wireline and logging-while-drilling (LWD) operations. FIG. 8 illustrates an example wireline well-logging system. The system includes a sonde tool 700 suspended from a wireline 802 inside a cased wellbore 804. In various embodiments, the tool 800 is used inside the production tubing 806 through which hydrocarbons are pumped out of the wellbore 804. The tool 800 includes a plurality of acoustic sensors 808 (such as, e.g., hydrophones), e.g., arranged in a linear array 810 along a longitudinal axis 811 of the tool 800 and, thus, of the wellbore 804. Further, the tool may include suitable control and processing circuitry 812, which may, in turn, be in communication (e.g., via a wired connection or a telemetry system) with a surface data-processing system 814. The data-processing facility providing the computational functionality for processing and fusing the acoustic signals received by the individual sensors 808 and classifying and/or quantifying the detected flows based on the fused signals may be implemented by either one of the control and processing circuitry 812 or the data-processing system 814, or by both in combination. For example, in some embodiments, the control and processing circuitry 812 pre-processes the individual sensor signals (e.g., through signal conditioning, filtering, and/or noise cancellation) and transmits them to the surface data-processing system 814, where the fused signals and fused-signal parameter map are computed, flow-induced acoustic sources are detected and localized based thereon, and flow type and/or one or more quantitative flow parameters (such as the flow rate) are further determined for the detected acoustic source(s) based on the acoustic signature(s) of the associated fused signal(s) (e.g., relevant features extracted from the fused signal(s)) in conjunction with the classification or estimation rules. Each of the control and processing circuitry 812 and the surface data-processing system 814 may generally be implemented in hardware, software, or a combination thereof, such as with special-purpose circuitry (e.g., a digital signal processor, field-programmable gate-array, etc.) or a suitably programmed general-purpose computer including, e.g., a processor and associated memory (as shown in FIG. 8) and, optionally, one or more machine-readable media (e.g., a hard disk, CD-ROM, memory key, etc.) and associated drives for non-volatile storage of program code implementing the various computational operations of the methods described herein. In various embodiments, the processed acoustic signals are evaluated in conjunction with measurements from other sensors (e.g., temperature and surface well-pressure measurements) to evaluate flow conditions and overall well integrity.

Alternative sensor configurations may be employed to support acoustic-source detection in a wireline logging operation. For example, in some embodiments, a distributed fiber optic cable is used in place of acoustic point sensors. The fiber optic cable can be permanently installed in the wellbore, e.g., clamped behind the casing or embedded in the cemented annulus. A channel, corresponding to a segment of the fiber-optic cable, can be scanned optically to detect surrounding acoustic signals. In this configuration, different channels at different depths correspond to different acoustic sensors.

Using a wireline logging tool 800, the acoustic sensor array can search, at a given depth of logging, a predefined two-dimensional space, for example, the array aperture length in the depth direction and a few feet into the formation in the radial direction. This search can be repeated as the array moves to another depth of logging. Thus, within one pass of wireline logging, a region spanning the entire length of the well can be searched for flow-induced acoustic sources. In some embodiments, the acoustic sensor array is operated in a fast logging speed (e.g., at as much as 60 feet per minute) to detect flows initially with coarse spatial resolution. Once one or more flows have been detected at certain depths, regions at those depths can be re-logged at a slower logging speed, or in stationary mode, to localize the flow(s) at a finer spatial resolution. In embodiments where an acoustic signal is emitted along an extended path (as opposed to from a point source), the whole flow path may be mapped out in a two-dimensional space of depth and radial distance.

Figure 9:
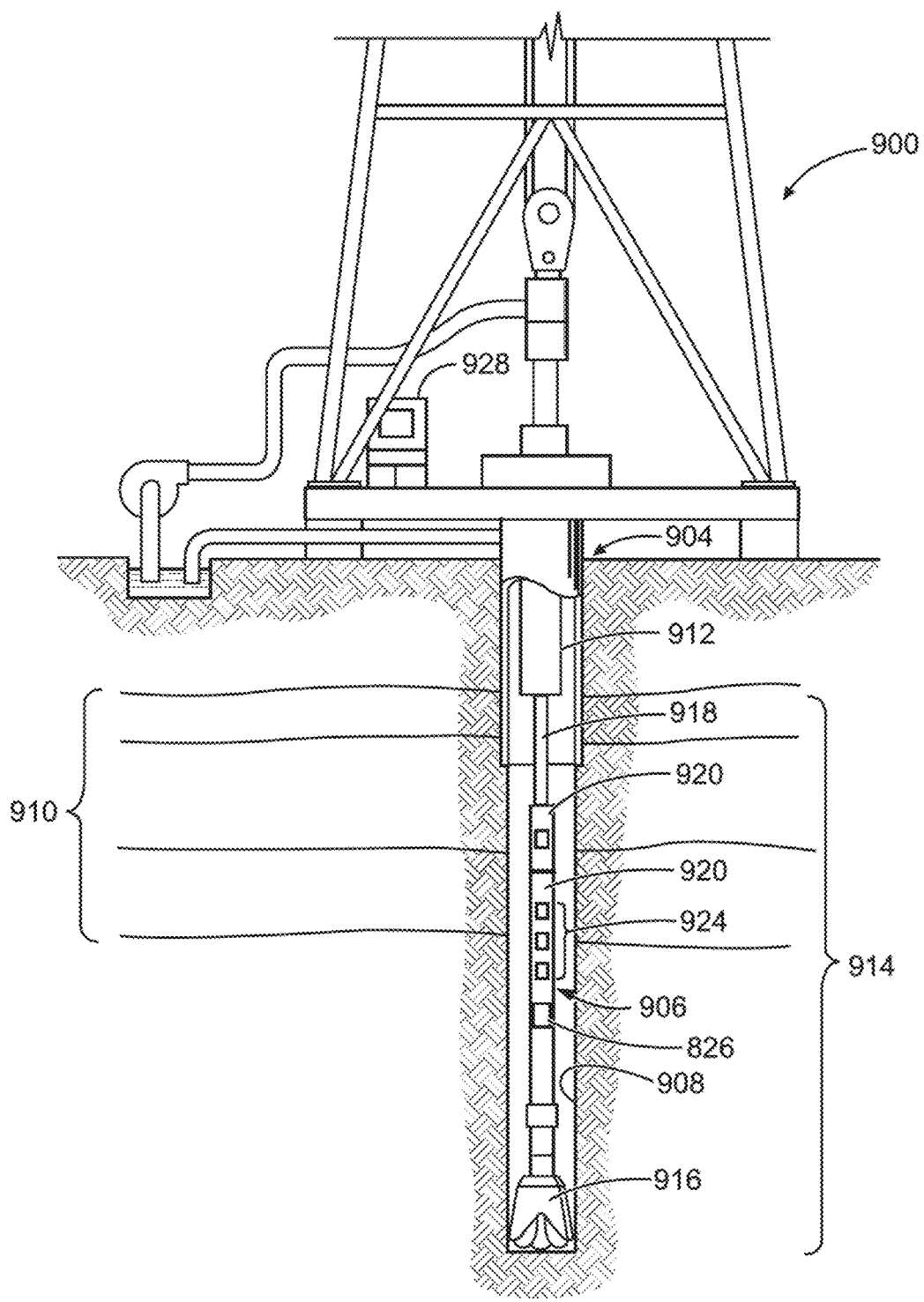
FIG. 9 is a schematic diagram of an example system for acoustic-source detection, localization, and characterization in a logging-while-drilling embodiment.

Turning now to FIG. 9, it can be seen that a system for detecting and localizing underground acoustic sources can also be implemented in a drilling system for LWD operations. This may be useful, e.g., to detect flows for the purpose of characterizing the formation and hydrocarbon reservoirs, and steer or otherwise adjust drilling based thereon. As shown, the drilling system includes a drilling rig 900 located at the surface of a well 904 and, supported by the drilling rig 900, a drill string 906 for drilling a wellbore 908 through subsurface formations 910. The drill string 906 includes a drill pipe 912 and, generally located at the lower end of the drill pipe 912, a bottom hole assembly (BHA) 914. The BHA 914 may include the drill bit 916 and, disposed thereabove, one or more drill collars 918, 920, which may contain a number of different tools and instruments adapted for taking measurements during the drilling process. In accordance with various embodiments, these tool may include an acoustic sensor array 924 (e.g., including two or more linearly arranged sensors) and associated control and processing circuitry 926, and may be in communication with a surface data-processing system 828. Collectively, the acoustic sensor array 924 and the control and processing circuitry 926 and/or data-processing system 928 provide functionality for implementing the above-described methods. Each of the control and processing circuitry 926 and the surface data-processing system 928 may generally be implemented in hardware, software, or a combination thereof, such as with special-purpose circuitry or a suitably programmed general-purpose computer.

Figure 10:
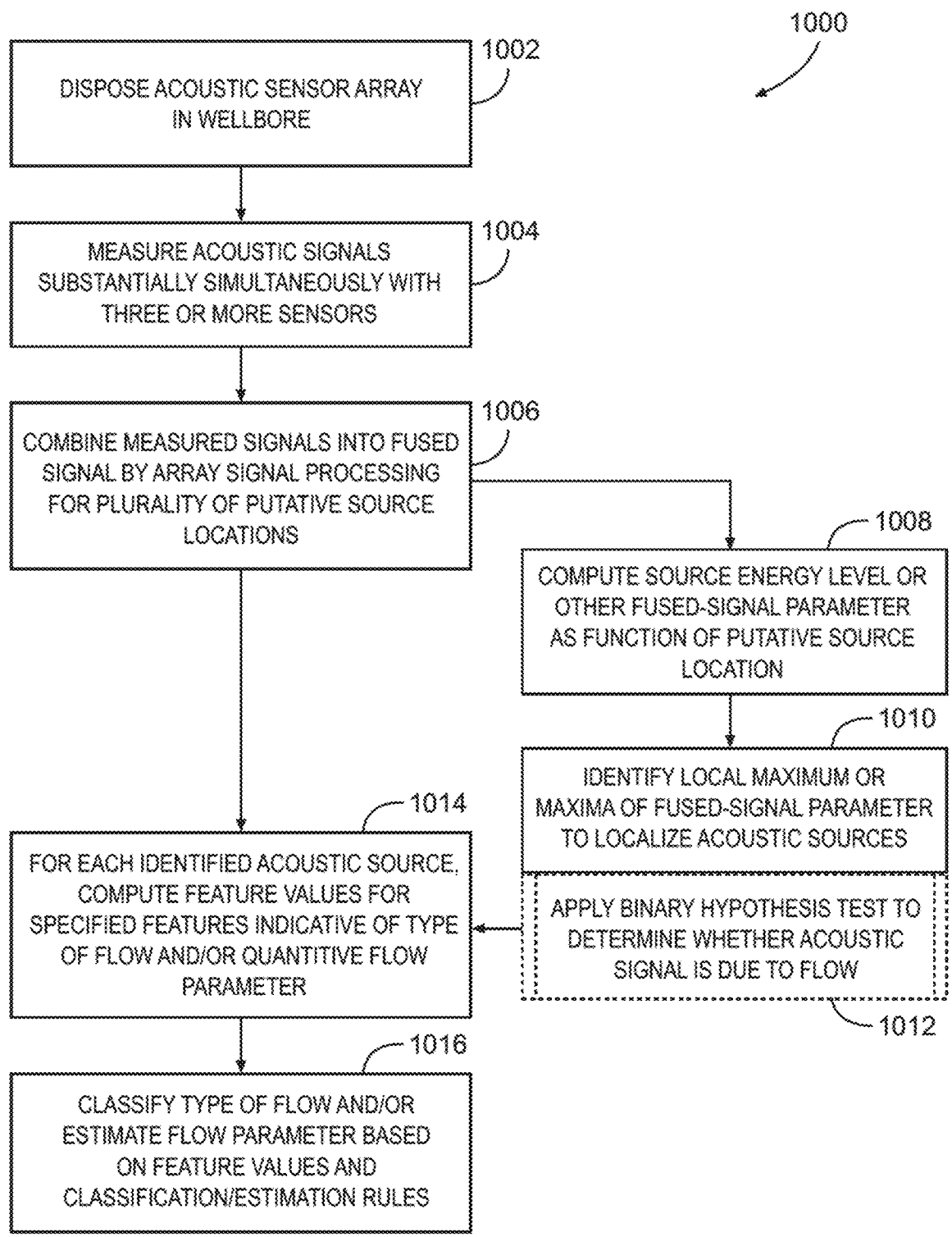
FIG. 10 is a flow chart summarizing an example method 900 for acoustic-source detection, localization, and characterization in accordance with various embodiments.

FIG. 10 is a flow chart summarizing an example method 1000 for acoustic-source detection, localization, and characterization in accordance with various embodiments. The method 1000 involves disposing an array of acoustic sensors in a wellbore, e.g., as part of a sonde tool 1000 on a wireline or as part of a BHA 914 on a drill string (act 1002). Further, the method involves measuring acoustic signals substantially simultaneously with two or more sensors of the array (act 1004). The measured signals are then combined, using a suitable array signal processing technique (e.g., conventional beamforming Capon's beamforming as described in detail above), into fused signals for a plurality of putative locations of the acoustic source (act 1006). The putative acoustic-source location may, for example, be specified by a depth in the wellbore and a radial distance from the wellbore, and optionally further by an azimuthal position. To detect and localize the acoustic source, a fused-signal parameter (e.g., an acoustic source energy level) may be computed from the fused signal as a function of the putative source location (act 1008), and one or more local maxima of the fused-signal parameter may then be identified in the resulting map (act 1010). In some embodiments, a binary hypothesis test, e.g., as described with respect to FIG. 4B, is applied to each identified local maximum to determine whether it, indeed, corresponds to an acoustic source resulting from flow (act 1012). For example, the acoustic energy level (or other fused-signal parameter) of an identified local maximum may be compared to a detection threshold, and only if it exceeds the threshold, the local maximum is deemed to belong to a flow-induced acoustic source. Once one or more acoustic sources have been detected, the associated fused signal(s) is further processed to characterize the flow qualitatively (e.g., in terms of a flow type) and/or quantitatively (e.g., in terms of a flow rate or other flow parameter). This is accomplished by computing feature values for one or more specified features indicative of the type of flow and/or of a quantitative flow parameter (act 1014), and then classifying the flow and/or quantifying the flow parameter based on the computed feature values and the classification and/or estimation rules determined, e.g., by the method 500 of FIG. 5A (act 1016).

Figure 11:
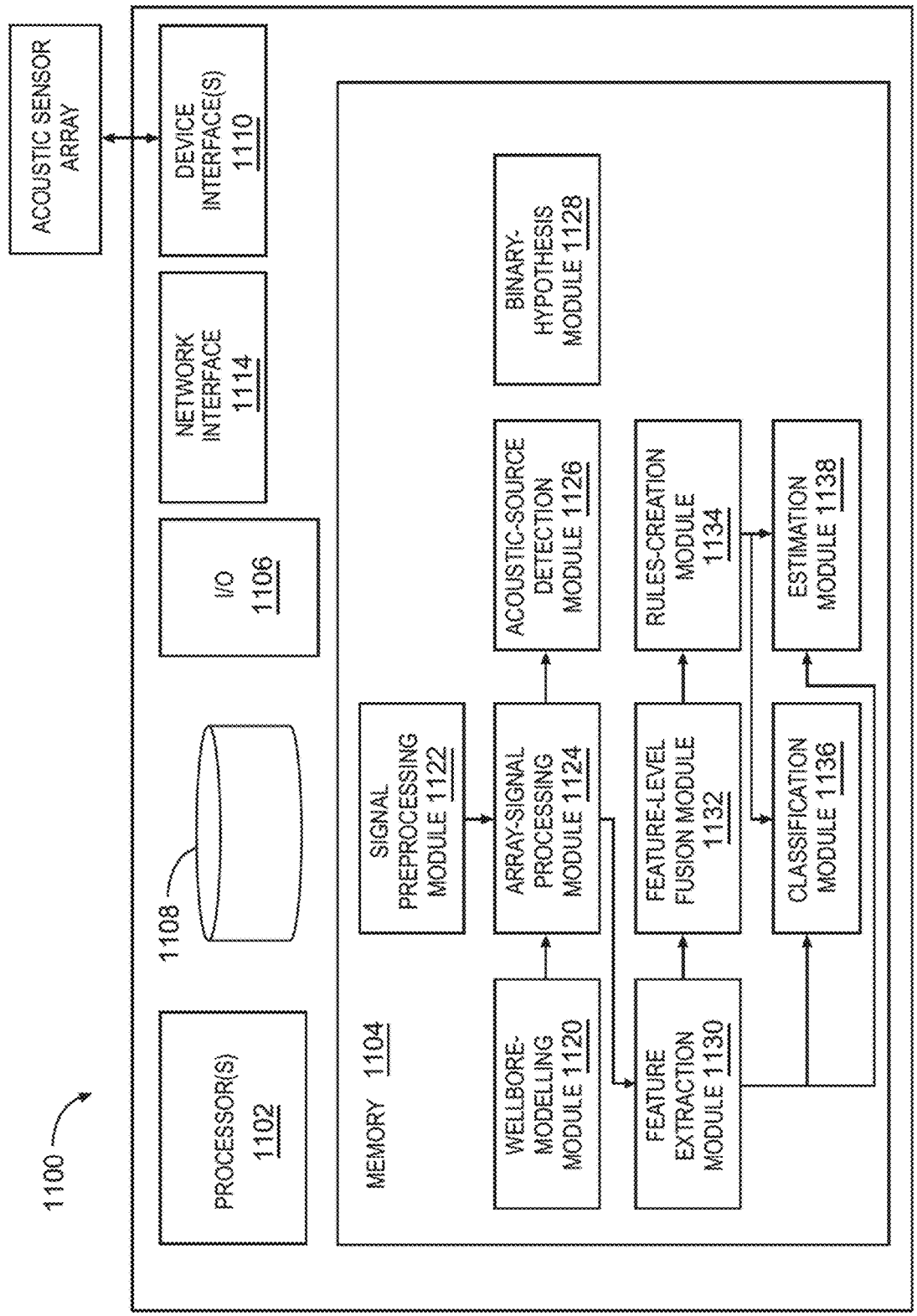
FIG. 11 is a block diagram of an example computing system for implementing the computational functionality of the method of FIG. 9, in accordance with various embodiments.

FIG. 11 is a block diagram of an example data-processing facility, in the form of a suitably programmed general-purposes computer (e.g., as may be implemented in the surface data-processing system 814), for implementing the computational functionality of the method of FIG. 10, in accordance with various embodiments. The data-processing facility 1100 includes one or more processors 1102 (e.g., a conventional central processing unit (CPU), graphical processing unit, or other) configured to execute software programs stored in memory 1104 (which may be, e.g., random-access memory (RAM), read-only memory (ROM), flash memory, etc.). Further, computing system 1100 may include user input/output devices 1106 (e.g., a screen, keyboard, mouse, etc.), permanent-data-storage devices 1008 (including, e.g., solid-state, optical, and/or magnetic machine-readable media such as hard disks, CD-ROMs, DVD-ROMs, etc.), device interfaces 1110 for communicating directly or indirectly with the acoustic sensor array (e.g., array 810, 924), a network interface 1114 that facilitates communication with other computer systems and/or data repositories, and a system bus (not shown) through which the other components communicate.

The software programs stored in the memory 1104 (and/or in permanent-data-storage devices 1008) include processor-executable instructions for performing the methods described herein, and may be implemented in any of various programming languages, for example and without limitation, C, C++, Object C, Pascal, Basic, Fortran, Matlab, and Python. The instructions may be grouped in various functional modules, e.g., for the purpose of re-use and sharing of the functionality of certain modules between other modules that utilize it. In accordance with the depicted embodiment, the modules include, for instance, a wellbore-modelling module 1120 for characterizing the wellbore and its surroundings and adjusting the free-space steering vector based thereon; a signal-preprocessing module 1122 implementing signal-conditioning, filtering, noise-cancellation, and similar processing operations; an array-signal processing module 1124 for fusing the acoustic signals from multiple sensors to compute a fused-signal parameter map for a range of putative depths and radial distances; an acoustic-source detection module 1126 for identifying one or more local-maxima indicative of acoustic sources in the fused-signal parameter map; and binary-hypothesis module 1128 for applying a binary-hypothesis test to the detected maxima to determine whether they are due to flows; a feature-extraction module 1030 for computing feature values (e.g., both to create the initial feature space in the process of creating classification/estimation rules, and later to extract specified features indicative of the type of flow and/or of a quantitative flow parameter); a feature-level fusion module 1032 for identifying features indicative of the type of flow and/or a quantitative flow parameter); a rules-creation module 1034 implementing statistical classification and estimation methods for deriving suitable classification and estimation rules; and classification and estimation modules 1036, 1038 for classifying the flow and/or quantifying the flow parameter based on computed feature values and the classification and/or estimation rules. Of course, the depicted organization into modules is merely one non-limiting example of ways in which instructions that implement the disclosed functionality can be grouped. Further, the overall functionality disclosed herein need not necessarily be implemented in a single data-processing facility. For example, modules for creating estimation/classification rules (e.g., in accordance with the method described in FIG. 5A) may be implemented separately from modules facilitating the classification and estimation by applying the rules to features extracted from test data (e.g., in accordance with the method described in FIG. 5B), at the cost of some duplication of the modules.

The following numbered examples are illustrative embodiments:

1. A method, comprising: substantially simultaneously measuring acoustic signals with each of at least two sensors disposed in an array within a wellbore; using an array signal processing technique to combine the measured acoustic signals into a fused signal; computing one or more feature values for one or more respective specified features from the fused signal, the one or more specified features comprising one or more features indicative of a type of flow causing the acoustic signals and/or one or more features indicative of a quantitative flow parameter of the flow causing the acoustic signals; and based on the one or more feature values, classifying the type of flow and/or quantifying the quantitative flow parameter.

2. The method of example 1, wherein the type of flow is classified based on one or more feature values for features indicative of the type of flow, the classifying comprising distinguishing between an oil flow, a gas flow, a water flow, a particle flow, and a multi-phase flow.

3. The method of example 1 or example 2, wherein the type of flow is classified using a Bayes test or a Neyman-Pearson test.

4. The method of any of examples 1-3, wherein the specified one or more features comprise one or more features indicative of a quantitative flow parameter, the quantitative flow parameter being a flow rate.

5. The method of any of examples 1-4, wherein the specified one or more features comprise one or more features indicative of a quantitative flow parameter, and wherein the quantitative flow parameter is quantified using Bayes estimation or maximum-likelihood estimation.

6. The method of any of examples 1-5, wherein the measured acoustic signals are combined into fused signals for a plurality of putative acoustic-source locations and an acoustic source is detected based on a local maximum of a fused-signal parameter computed from the fused signals as a function of the putative acoustic-source locations, and wherein the fused signal from which the one or more feature values are computed is associated with the detected acoustic source.

7. The method of example 6, wherein the putative acoustic-source locations comprise a depth and a radial distance from a longitudinal axis of the wellbore.

8. The method of example 6 or example 7, further comprising applying a binary hypothesis test to the local maximum of the fused-signal parameter to determine whether the detected acoustic source is due to flow.

9. The method of any of examples 6-8, wherein the measured acoustic signals are combined using a steering vector.

10. The method of example 9, wherein the steering vector is based at least in part on a configuration of the wellbore and surrounding formation.

11. The method of any of examples 1-10, wherein the type of flow is classified based on one or more feature values for features indicative of the type of flow, the method further comprising computing at least one of a sensitivity or a specificity of the classification.

12. The method of any of examples 1-11, wherein the quantitative flow parameter is quantified based on one or more feature values for features indicative of the quantitative flow parameter, the method further comprising computing a confidence level for the quantified flow parameter.

13. A system comprising: a sensor array disposed within a wellbore, the sensor array comprising a plurality of acoustic sensors for substantially simultaneously measuring acoustic signals received thereat; and a data-processing facility configured to combine the measured acoustic signals into a fused signal using an array signal processing technique, and to compute one or more feature values for one or more respective specified features from the fused signal, the one or more features comprising at least one of one or more features indicative of a type of flow causing the acoustic signals or one or more features indicative of a quantitative flow parameter of the flow causing the acoustic signal.

14. The system of example 13, wherein the data-processing facility is further configured to classify the type of flow or quantify the quantitative flow parameter based on the computed one or more feature values.

15. The system of example 13 or example 14, wherein the acoustic sensors comprise at least one of an omnidirectional hydrophone, a fiber-optic cable, or a Fiber Bragg Grating sensor.

16. The system of any of examples 13-15, wherein the acoustic sensors form a linear array disposed along a longitudinal axis of the wellbore.

17. A machine-readable medium storing instructions for processing acoustic signals measured by a plurality of acoustic sensors, the instructions, when executed by one or more processors of the machine, causing the one or more processors to: combine the measured acoustic signals into a fused signal using an array signal processing technique; compute one or more feature values for one or more respective specified features from the fused signal, the one or more specified features comprising one or more features indicative of a type of flow causing the acoustic signals and/or one or more features indicative of a quantitative flow parameter of the flow causing the acoustic signals; and based on the one or more feature values, classify the type of flow and/or quantify the quantitative flow parameter.

18. The machine-readable medium of example 17, the instructions further causing the one or more processors to combine the measured signals into fused signals for a plurality of putative acoustic-source locations and detect an acoustic source based on a local maximum of a fused-signal parameter computed from the fused signals as a function of the putative acoustic-source locations, wherein the fused signal from which the one or more feature values are computed is associated with the detected acoustic source.

19. The machine-readable medium of example 17 or example 18, wherein the type of flow is classified based on one or more feature values for features indicative of the type of flow, the instructions further causing the one or more processors to compute at least one of a sensitivity or a specificity of the classification.

20. The machine-readable medium of any of examples 17-19, wherein the quantitative flow parameter is quantified based on one or more feature values for features indicative of the quantitative flow parameter, the instructions further causing the one or more processors to compute a confidence level for the quantified flow parameter.

Many variations may be made in the systems, tools, and methods described and illustrated herein without departing from the scope of the inventive subject matter. Accordingly, the scope of the inventive subject matter is to be determined by the scope of the following claims and all additional claims supported by the present disclosure, and all equivalents of such claims.

What is claimed is:

1. A method, comprising:
    substantially simultaneously measuring acoustic signals with each of at least two sensors disposed in an array within a wellbore;
    using an array signal processing technique to combine the measured acoustic signals into a fused signal;
    computing one or more feature values for one or more respective specified features from the fused signal, the one or more specified features comprising at least one of one or more features indicative of a type of flow causing the acoustic signals or one or more features indicative of a quantitative flow parameter of the flow causing the acoustic signals; and
    based on the one or more feature values, at least one of classifying the type of flow or quantifying the quantitative flow parameter,
    wherein the measured acoustic signals are combined into fused signals for a plurality of putative acoustic-source locations and an acoustic source is detected based on a local maximum of a fused-signal parameter computed from the fused signals as a function of the putative acoustic-source locations, and
    wherein the fused signal from which the one or more feature values are computed is associated with the detected acoustic source.

2. The method of claim 1, wherein the type of flow is classified based on one or more feature values for features indicative of the type of flow, the classifying comprising distinguishing between an oil flow, a gas flow, a water flow, a particle flow, and a multi-phase flow.

3. The method of claim 1, wherein the type of flow is classified using a Bayes test or a Neyman-Pearson test.

4. The method of claim 1, wherein the specified one or more features comprise one or more features indicative of a quantitative flow parameter, the quantitative flow parameter being a flow rate.

5. The method of claim 1, wherein the specified one or more features comprise one or more features indicative of a quantitative flow parameter, and wherein the quantitative flow parameter is quantified using Bayes estimation or maximum-likelihood estimation.

6. The method of claim 1, wherein the putative acoustic-source locations comprise a depth and a radial distance from a longitudinal axis of the wellbore.

7. The method of claim 1, further comprising applying a binary hypothesis test to the local maximum of the fused-signal parameter to determine whether the detected acoustic source is due to flow.

8. The method of claim 1, wherein the measured acoustic signals are combined using a steering vector.

9. The method of claim 8, wherein the steering vector is based at least in part on a configuration of the wellbore and surrounding formation.

10. The method of claim 1, wherein the type of flow is classified based on one or more feature values for features indicative of the type of flow, the method further comprising computing at least one of a sensitivity or a specificity of the classification.

11. The method of claim 1, wherein the quantitative flow parameter is quantified based on one or more feature values for features indicative of the quantitative flow parameter, the method further comprising computing a confidence level for the quantified flow parameter.

12. A system comprising:
    a sensor array disposed within a wellbore, the sensor array comprising a plurality of acoustic sensors for substantially simultaneously measuring acoustic signals received thereat; and
    a data-processing facility configured to combine the measured acoustic signals into a fused signal using an array signal processing technique, and to compute one or more feature values for one or more respective specified features from the fused signal, the one or more features comprising at least one of one or more features indicative of a type of flow causing the acoustic signals or one or more features indicative of a quantitative flow parameter of the flow causing the acoustic signal,
    wherein the measured acoustic signals are combined into fused signals for a plurality of putative acoustic-source locations and an acoustic source is detected based on a local maximum of a fused-signal parameter computed from the fused signals as a function of the putative acoustic-source locations, and
    wherein the fused signal from which the one or more feature values are computed is associated with the detected acoustic source.

13. The system of claim 12, wherein the data-processing facility is further configured to classify the type of flow or quantify the quantitative flow parameter based on the computed one or more feature values.

14. The system of claim 12, wherein the acoustic sensors comprise at least one of an omnidirectional hydrophone, a fiber-optic cable, or a Fiber Bragg Grating sensor.

15. The system of claim 12, wherein the acoustic sensors form a linear array disposed along a longitudinal axis of the wellbore.

16. A machine-readable medium storing instructions for processing acoustic signals measured by a plurality of acoustic sensors, the instructions, when executed by one or more processors of the machine, causing the one or more processors to:
    combine the measured acoustic signals into a fused signal using an array signal processing technique;
    compute one or more feature values for one or more respective specified features from the fused signal, the one or more specified features comprising at least one of one or more features indicative of a type of flow causing the acoustic signals or one or more features indicative of a quantitative flow parameter of the flow causing the acoustic signals; and based on the one or more feature values, at least one of classify the type of flow or quantify the quantitative flow parameter, the instructions further causing the one or more processors to combine the measured signals into fused signals for a plurality of putative acoustic-source locations and detect an acoustic source based on a local maximum of a fused-signal parameter computed from the fused signals as a function of the putative acoustic-source locations, wherein the fused signal from which the one or more feature values are computed is associated with the detected acoustic source.

17. The machine-readable medium of claim 16, wherein the type of flow is classified based on one or more feature values for features indicative of the type of flow, the instructions further causing the one or more processors to compute at least one of a sensitivity or a specificity of the classification.

18. The machine-readable medium of claim 16, wherein the quantitative flow parameter is quantified based on one or more feature values for features indicative of the quantitative flow parameter, the instructions further causing the one or more processors to compute a confidence level for the quantified flow parameter.

* * * * *